US007225179B2

(12) United States Patent
Iwata et al.

(10) Patent No.: US 7,225,179 B2
(45) Date of Patent: *May 29, 2007

(54) QUERYING DATABASE SYSTEM TO EXECUTE STORED PROCEDURES USING ABSTRACT DATA TYPE ATTRIBUTES, RETRIEVING LOCATION INFORMATION OF DATA, SUB-DATA BETWEEN FIRST AND SECOND SERVERS

(75) Inventors: Morihiro Iwata, Tama (JP); Masashi Tsuchida, Sagamihara (JP); Yukio Nakano, Kawasaki (JP); Norihiro Hara, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/208,533

(22) Filed: Aug. 23, 2005

(65) Prior Publication Data
US 2005/0283493 A1 Dec. 22, 2005

Related U.S. Application Data

(63) Continuation of application No. 10/379,673, filed on Mar. 6, 2003, now Pat. No. 6,959,302, which is a continuation of application No. 09/998,219, filed on Dec. 3, 2001, now Pat. No. 6,564,205, which is a continuation of application No. 09/369,327, filed on Aug. 6, 1999, now abandoned, which is a continuation of application No. 08/918,106, filed on Aug. 27, 1997, now Pat. No. 5,940,289.

(30) Foreign Application Priority Data
Aug. 28, 1996 (JP) .................................. 8-226406

(51) Int. Cl.
G06F 17/30 (2006.01)

(52) U.S. Cl. ......................... 707/2; 707/100; 707/102; 707/104.1
(58) Field of Classification Search ................ 707/1–5, 707/10, 100, 102, 104.1; 700/2; 705/5, 705/19; 709/224, 223, 225; 714/1; 715/513, 715/530; 719/330
See application file for complete search history.

(56) References Cited

U.S. PATENT DOCUMENTS 5,048,009 A 9/1991 Conrad ........................ 370/252

(Continued)

FOREIGN PATENT DOCUMENTS

GB 2296799 7/1996

OTHER PUBLICATIONS

DeWitt et al., "Parallel Database Systems: The Future of High Performance Database Systems", *Communications of the ACM*, Jun. 1992, vol. 35, No. 6, pp. 84-98.

(Continued)

*Primary Examiner*—Apu M. Mofiz
*Assistant Examiner*—Jacques Veillard
(74) *Attorney, Agent, or Firm*—Mattingly, Stanger, Malur & Brundidge, P.C.

(57) ABSTRACT

A parallel database system retrieval method and system for transferring from database operation servers to a front end server only those data items that are used in subsequent processing, thereby shortening the query time when the unused data are massive. The invention allows an initial retrieval query to transfer only location information about the target data from a database operation server to the front end server. Using the location information the invention permits a subsequent query to get variable-bound location information so that the latter query will retrieve a desired sub-data item according to the acquired location information and dictionary information about the sub-data item locations within the data.

15 Claims, 17 Drawing Sheets

U.S. PATENT DOCUMENTS

| | | | |
|---|---|---|---|
| 5,398,336 A | 3/1995 | Tantry et al. | 707/103 R |
| 5,426,780 A | 6/1995 | Gerull et al. | 707/3 |
| 5,522,077 A | 5/1996 | Cuthbert et al. | 707/103 R |
| 5,590,321 A | 12/1996 | Lin et al. | 707/10 |
| 5,649,139 A | 7/1997 | Weinreb et al. | 711/202 |
| 5,729,730 A | 3/1998 | Wlaschin et al. | 707/3 |
| 5,737,395 A | 4/1998 | Irribarren | 379/88.13 |
| 5,754,841 A | 5/1998 | Carino, Jr. | 707/3 |
| 5,765,147 A | 6/1998 | Mattos et al. | 707/4 |
| 5,794,250 A | 8/1998 | Carino et al. | 707/9 |
| 5,799,310 A | 8/1998 | Anderson et al. | 707/102 |
| 5,806,065 A | 9/1998 | Lomet | 707/8 |
| 5,813,005 A | 9/1998 | Tsuchida et al. | 707/10 |
| 5,878,409 A | 3/1999 | Baru et al. | 707/2 |
| 5,918,229 A | 6/1999 | Davis et al. | 707/10 |
| 5,930,800 A | 7/1999 | Hara et al. | 707/103 R |
| 5,940,289 A | 8/1999 | Iwata et al. | 700/2 |
| 5,999,924 A | 12/1999 | Bair et al. | 707/4 |
| 6,031,978 A | 2/2000 | Cotner et al. | 709/248 |
| 6,067,542 A * | 5/2000 | Carino, Jr. | 707/4 |
| 6,226,635 B1 | 5/2001 | Katariya | 707/4 |
| 6,249,800 B1 | 6/2001 | Aman et al. | 718/105 |
| 6,347,312 B1 | 2/2002 | Byrne et al. | 707/3 |
| 6,564,205 B2 | 5/2003 | Iwata et al. | 707/2 |
| 6,959,302 B2 * | 10/2005 | Iwata et al. | 707/101 |

OTHER PUBLICATIONS

Wade et al., "Object Query Standards", *SIGMOD Record*, Mar. 1996, vol. 25, No. 1, pp. 86-93.

Baru t al., XML-Based Information Mediation for Digital Libraries, ACM 1999, pp. 214-216.

Milo et al., Type Interface for Queries on Semistructured Data, ACM 1999, pp. 215-226.

* cited by examiner

FIG. 2

EXAMPLE OF DEFINING THE TYPES OF DATA MADE OF A PLURALITY OF SUB-DATA ITEMS — 21

```
CREATE TYPE ADDRESS_TYPE (                  ⎫  201
   PUBLIC ZIP_CODE CHAR (6),                 ⎬  SUB-DATA DEFINITION
   PUBLIC ADDRESS CHAR (20),                 ⎪
   PUBLIC TELEPHONE_NO. CHAR (10)           ⎭

PUBLIC FUNCTION (number int)              ⎫  202
   RETURNS                                   ⎬  FUNCTION DEFINITION
   FUNCTION PROPER                           ⎪
   RETURN address_data);                    ⎭
```

TYPICAL DATA CREATED FROM TYPE — 22
CREATE TABLE ADDRESS_RECORDS
(id INT, NAME CHAR(10), ADDRESS_DATA) ;

ADDRESS RECORD TABLE                           TYPICAL SUB-DATA ITEMS — 204

| ID | NAME | ADDRESS DATA |
|----|------|--------------|
| 1 | YAMADA | ZIP CODE : 114<br>ADDRESS : TOKYO<br>TELEPHONE NO. : 03-3735-XXXX |
| 2 | SATO | ZIP CODE : 223<br>ADDRESS : YOKOHAMA<br>TELEPHONE NO. : 045-564-XXXX |
| 3 | TANAKA | ZIP CODE : 830<br>ADDRESS : HAKATA<br>TELEPHONE NO. : 0942-43-XXXX |

203 — TYPICAL DATA COMPOSED OF SUB-DATA ITEMS

EXAMPLE OF QUERY FOR RETRIEVING DATA MADE OF — 23
A PLURALITY OF SUB-DATA ITEMS
SELECT ZIP_CODE (ADDRESS_DATA) FROM ADDRESS_RECORDS

205 — TYPICAL RETRIEVAL OF SUB-DATA ITEM

SELECT ADDRESS_DATA FROM ADDRESS_RECORDS
WHERE ADDRESS (ADDRESS_DATA) = YOKOHAMA

206 — TYPICAL RETRIEVAL OF DATA

FIG. 6
SUB-DATA OFFSET INFORMATION — 124
| IDENTIFIER | DATA TYPE | DATA LENGTH | OFFSET |
|---|---|---|---|
| SUB-DATA 1 | INT | 4 | 0 |
| SUB-DATA 2 | CHAR | 2 | 4 |
| SUB-DATA 3 | FLOAT | 8 | 6 |
FIG. 7
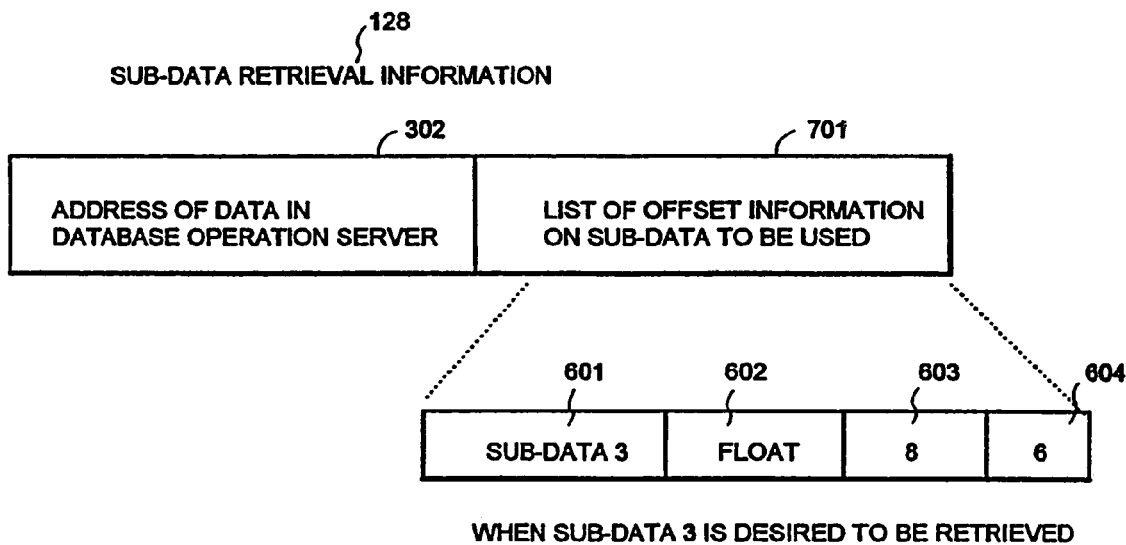
SUB-DATA RETRIEVAL INFORMATION — 128
| ADDRESS OF DATA IN DATABASE OPERATION SERVER (302) | LIST OF OFFSET INFORMATION ON SUB-DATA TO BE USED (701) |
| SUB-DATA 3 (601) | FLOAT (602) | 8 (603) | 6 (604) |
WHEN SUB-DATA 3 IS DESIRED TO BE RETRIEVED
FIG. 8
SUB-DATA 3 — 129
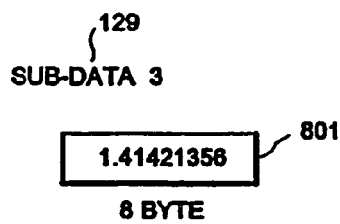
1.41421356 — 801
8 BYTE

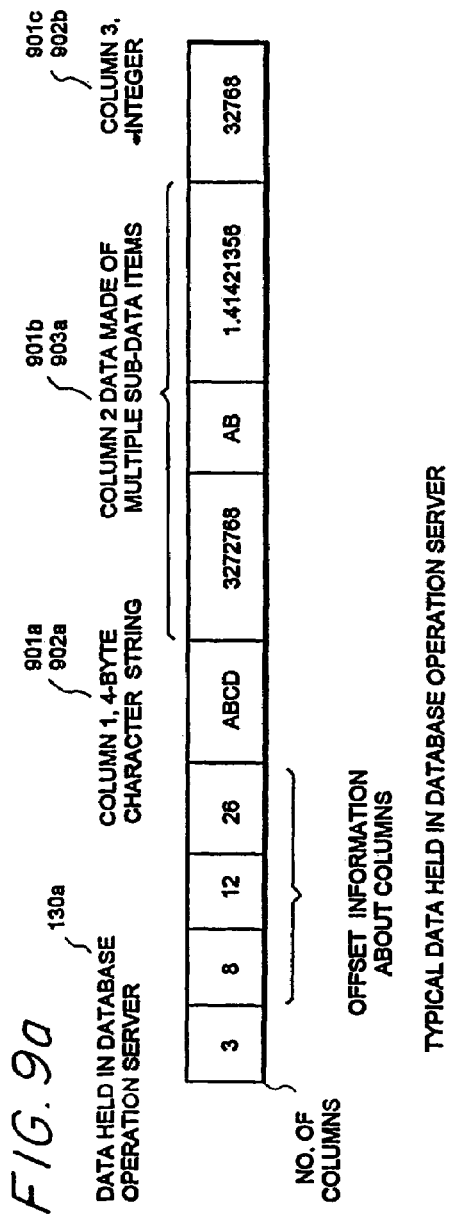
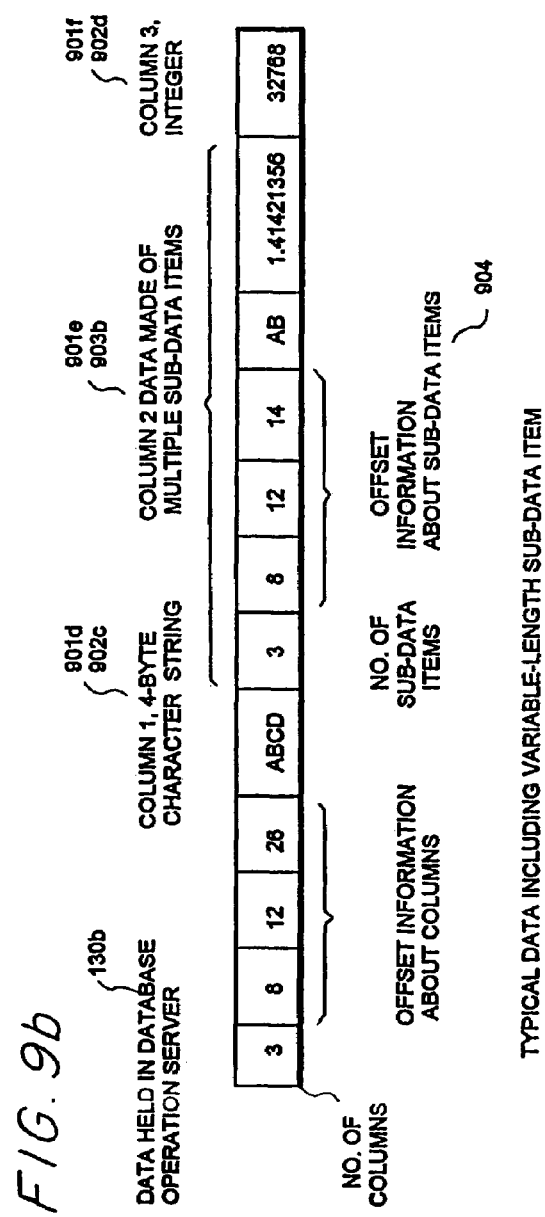

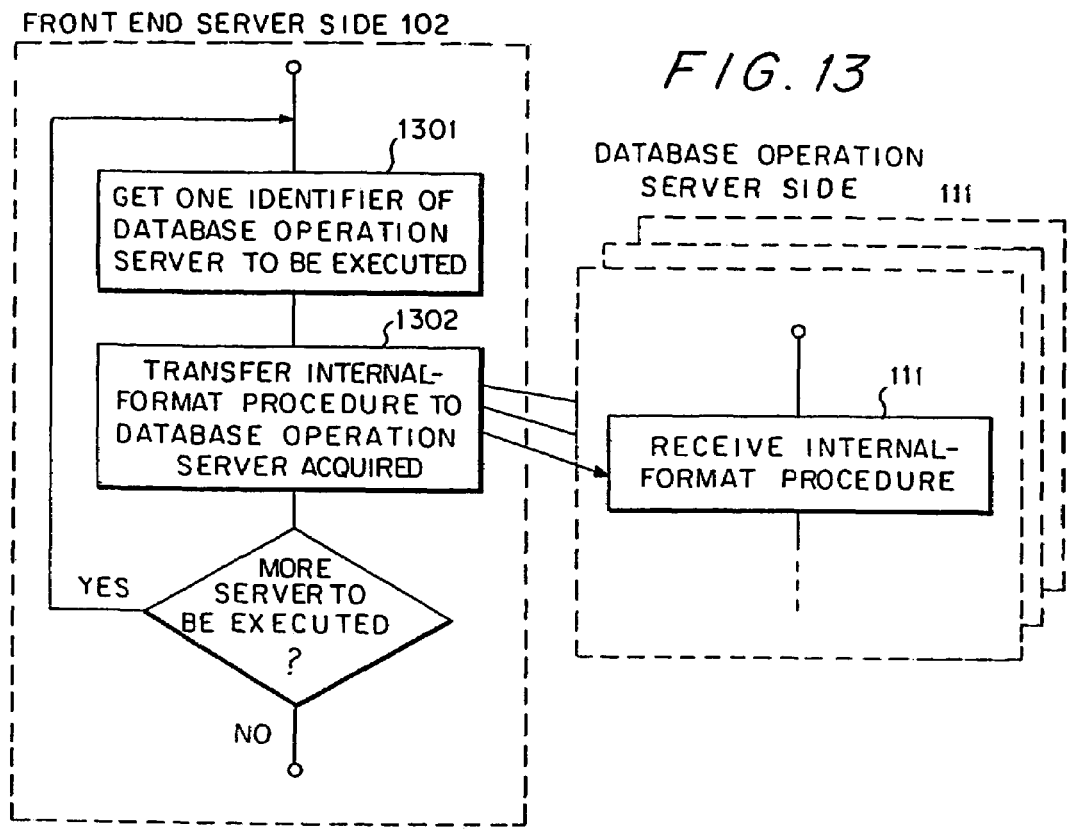
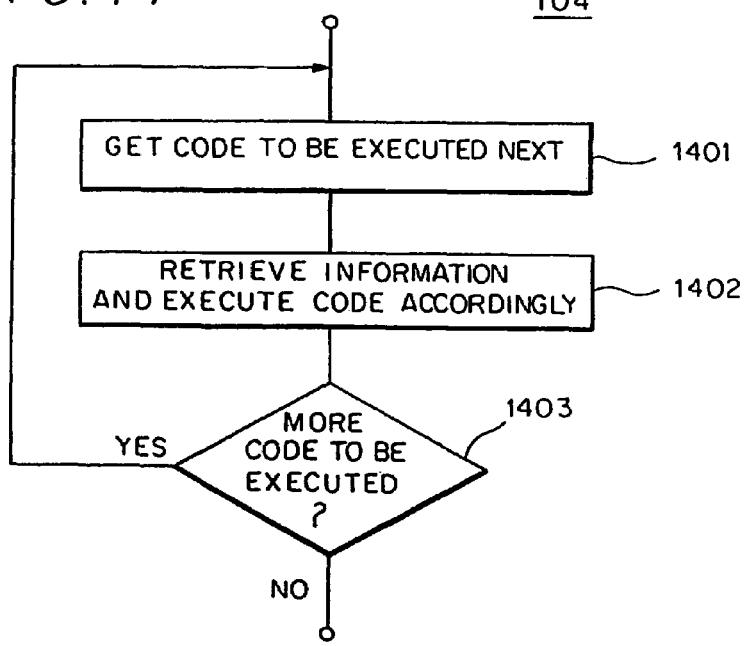

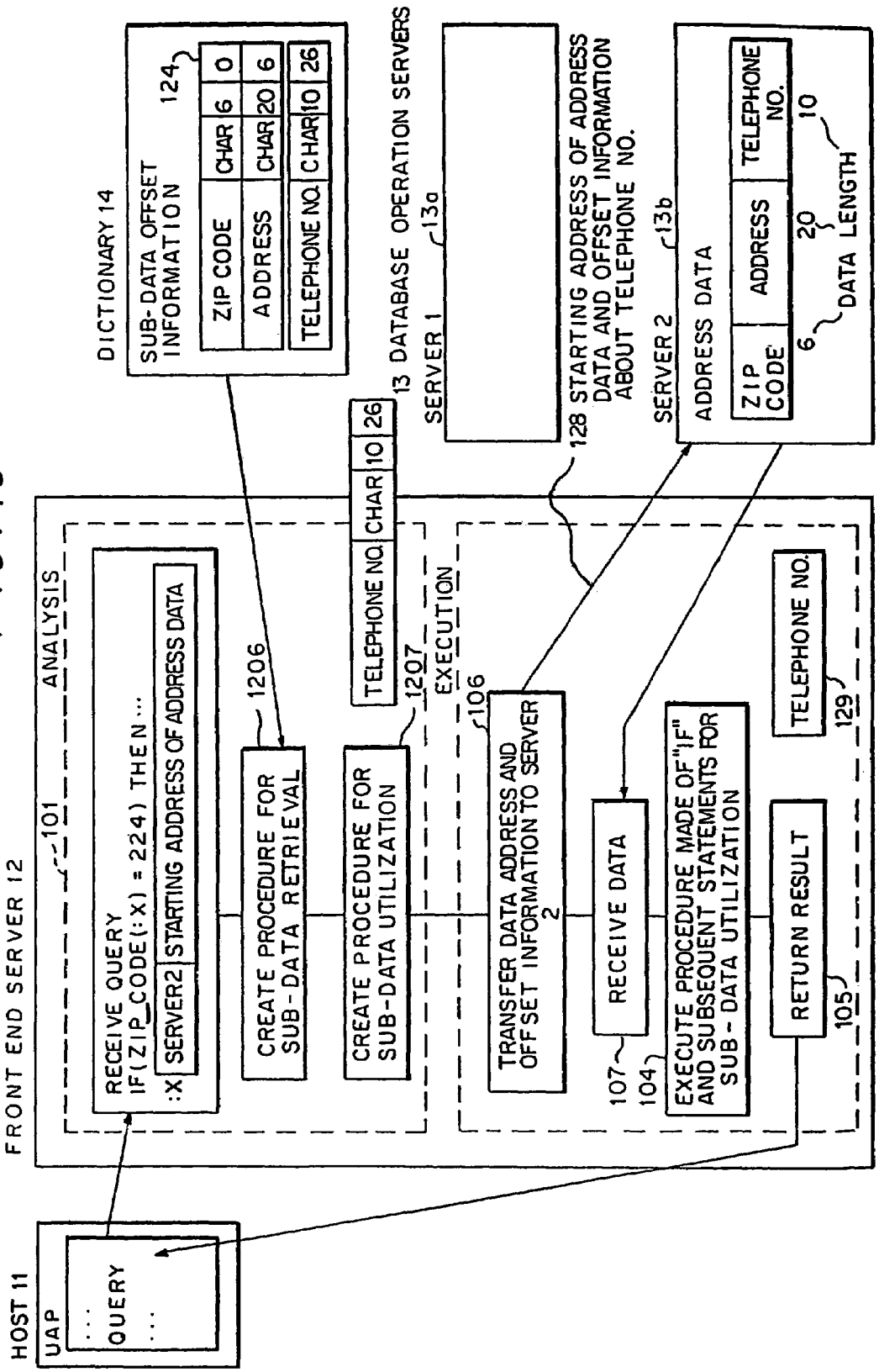

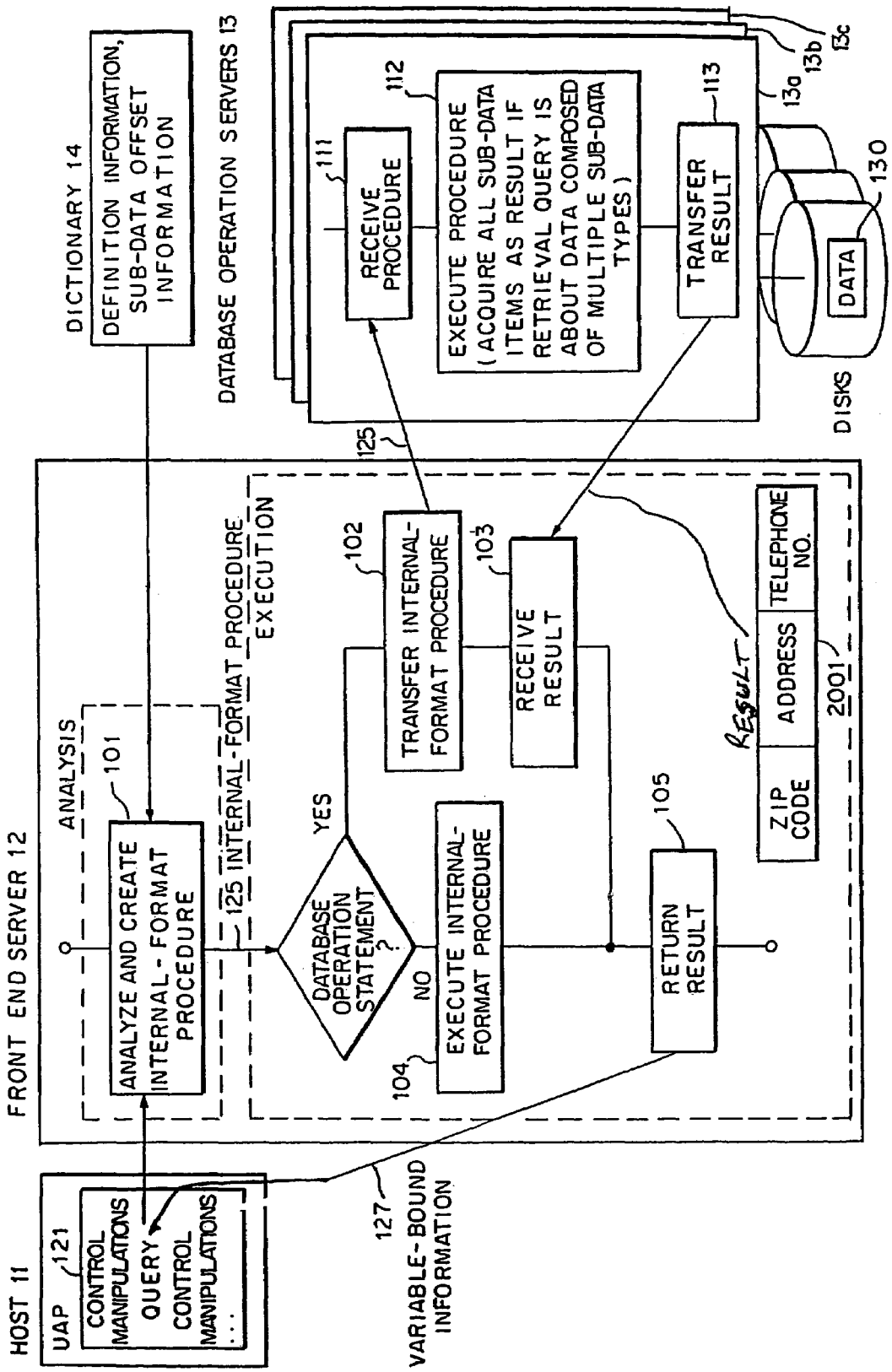

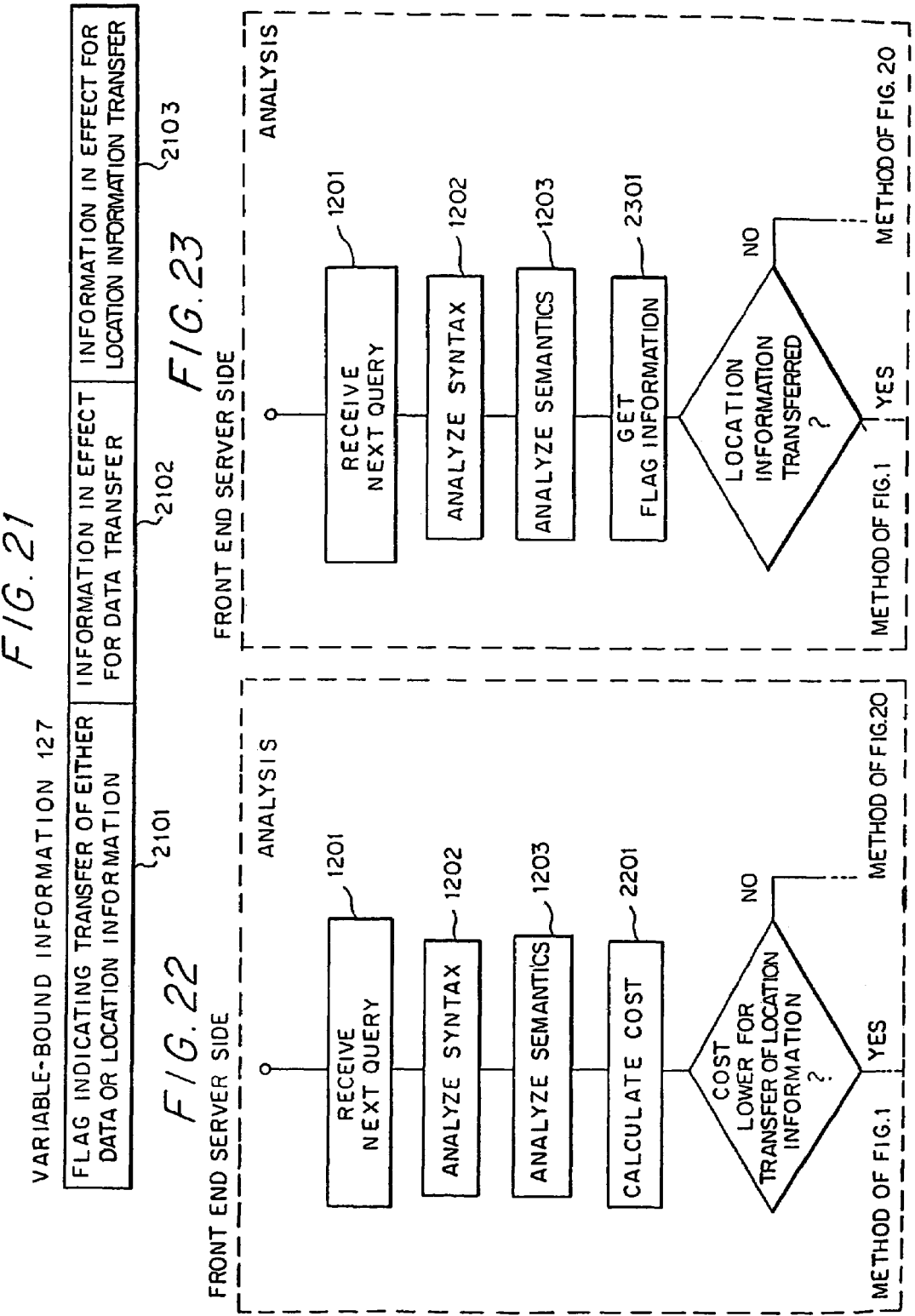

QUERYING DATABASE SYSTEM TO EXECUTE STORED PROCEDURES USING ABSTRACT DATA TYPE ATTRIBUTES, RETRIEVING LOCATION INFORMATION OF DATA, SUB-DATA BETWEEN FIRST AND SECOND SERVERS

CROSS-REFERENCE OF RELATED APPLICATIONS

This application is a continuation of application Ser. No. 10/379,673, filed on Mar. 6, 2003, which was a continuation of application Ser. No. 09/998,219, filed on Dec. 3, 2001, now issued as U.S. Pat. No. 6,564,205, issued May 13, 2005, which was a continuation of application Ser. No. 09/369,327, filed on Aug. 6, 1999, which is a continuation of application Ser. No. 08/918,106, filed on Aug. 27, 1997, now issued as U.S. Pat. No. 5,940,289 on Aug. 17, 1999, which are incorporated by reference herein.

BACKGROUND OF THE INVENTION

The present invention relates to a database management system. More particularly, the present invention relates to a query processing method and system that may be adapted advantageously to parallel query processing suitable for relational database management systems.

There are two known conventional database management systems: Abstract Data Type of SQL3, and parallel database systems.

The Abstract Data Type of SQL3 will be described first. Currently, relational database systems, particularly SQL database systems, are increasingly finding their way into administrative data processing and other related fields. Efforts are also under way to implement so-called object database systems. These systems are difficult to operate efficiently in the conventional framework of relational databases, handling data of complicated structures as one of their objectives.

Studies have been performed to expand relational databases so that they may handle data of complex structures. The results of the research are currently merged into SQL3 for standardization. A SQL3 database system is capable of handling user-defined data (types) having complex structures called the Abstract Data Type (ADT). Under the ADT scheme, data called attributes (called sub-data hereunder) are hidden behind function interfaces so that a database system may handle and inherit object-oriented complicated data from one data type to another.

A data type is defined by use of a definition SQL statement beginning with "CREATE TYPE." Defined types may be used for variable declarations and table column definitions just like the system-defined integer type and character type. Using these types makes it possible to create and utilize data of complicated structures.

The ADT of SQL3 is discussed illustratively by Andrew E. Wade, Ph. D., in "Object Query Standards" ACM SIGMOD Record, Vol. 25, No. 1, pp. 87–92, March 1996. A draft of SQL3 standards is available from ISO/IEC JTC1/SC21/WG3 DBL-MCI-004, ISO Working Draft Database Language SQL, 1996.

Parallel database systems will now be described. A relational database system may easily enhance its performance by having data distributed to a plurality of database processing servers for parallel access therethrough. Along with skyrocketing increases in quantities of data to be handled has come a growing demand for such parallel database systems. Parallel database systems are discussed illustratively by DeWitt, D., et. al., in "Parallel Database Systems: The Future of High Performance Database Systems" (CACM, Vol. 35, No. 6, 1992).

Typically, the parallel database system includes a server (called a front end server) for analyzing and compiling queries made by a user application program (UAP) in a host computer to the database, and a plurality of servers (called database operation servers) for accessing disk drives holding data and for manipulating data therein. For purpose of simplification and illustration, the parallel database system is assumed in the description below to have a single front end server and a plurality of database operation servers. However, it is also possible for the system to have a plurality of front end servers for handling a plurality of queries from one or multiple hosts. In such a case, each query is dealt with by a setup of one host, one front end server and a plurality of database operation servers. Thus, the system is perfectly applicable to the multiple front end server setup as well.

Generally, the SQL representing queries directed at a database (called database queries hereunder) is often embedded (called embedded SQL) in computer language such as C (called the host language hereunder). In operation, the host language in the host computer issues database queries such as searches through the database as well as updates, deletions and insertions in the database. In turn, the database system analyzes and compiles the queries and returns the result to the host. The host language uses the received result in control processing such as decisions as well as in data manipulations such as insertions and calculations. This invention also applies to stored procedures whereby database queries including control operations and data manipulations are issued.

In this case, the processing performed on the side of database operation servers such as searches, insertions, updates and deletions in the database is sometimes called database operation statements, distinct from the processing on the side of the front end server such as control operations and data manipulations.

Stored procedures are described illustratively by Hatsuko Katayama in "Utilizing Stored Procedures and Triggers," Nikkei Open Systems, No. 2, pp. 133–144, 1993.

The host language may have a plurality of database queries embedded therein. This allows the result of queries to be exchanged through the use of host language variables. The transfer of values in variables is determined by the manner in which the result of analysis is processed by the host language. One way of value transfer through variables involves determining in advance an area in which to accommodate a value for each of the variables used, with appropriate information "bound" to the variables so that the areas may later be referenced through the bound information for access to the values therein.

What follows is a description of a typical example in which the embedded SQL is used to create, transfer and execute procedures in an internal format of a parallel database system. The result of database operations is manipulated and/or controlled by UAP (user application program) control statements written in the embedded SQL. Database queries are sent one statement at a time over a network to the front end server connected with the user application program. A compiler subjects the queries to syntax analysis, semantic analysis and optimizing compilation. This creates an internal-format procedure for carrying out actual database operations based on the received database queries.

The internal-format procedure includes codes to be interpreted and executed by an interpreter as well as execute form codes. Definition information needed for the compilation is provided as dictionary information that may be accessed by the front end server. The procedure thus created is transferred over the network to a database operation server that actually operates the database by executing the procedure. Usually the server that performs the actual database operation is determined by information about partitioning of a table for operations. The information about table partitioning is designated by table definitions which are placed in a dictionary. Each database operation server has a processor and at least one disk drive.

A proposed improvement involves placing the internal-format procedure in a cache of a database operation server, so that a second and subsequent queries performed may each issue an execution request to use the procedure that resides in the cache. The typical parallel database system has a plurality of database operation servers for parallel SQL processing. A database operation server exchanges data with other database operation servers as needed over the network, and the result of the SQL processing is eventually returned via the front end server to the user application program for manipulations of and/or control operations on the executed result. The processing is repeated thereafter for each SQL statement.

Where data to be handled in database queries are a collection of a plurality of data items (called attributes or sub-data items in the ADT environment), there are two ways to process the data (i.e., for searches, updates, insertions, manipulations or control operations): either to deal with the sub-data items making up the data one at a time, or to process the data as a whole. In an example of using database queries, the data as a whole may be retrieved first in response to the initial query and the retrieved data may be submitted, in response to subsequent queries, to the front end server one sub-data item at a time for individual processing. In such a case, the subsequent queries may or may not use all sub-data items constituting the retrieved data. However, where techniques of the conventional parallel database system described earlier are adapted to the ADT, what happens is that the data retrieved as a result of a query and bound for the host are all transferred from the database operation server in question to the front end server for subsequent analysis and execution. If the unused sub-data items are massive (e.g., those of LOB data), the time required to transfer such unnecessary data from the database operation server to the front end server can be considerable. Thus it takes more time to deal with queries.

SUMMARY OF THE INVENTION

It is an object of the present invention to provide a parallel database system retrieval method and system for transferring from database operation servers to the front end server only those data items that are used in subsequent processing, whereby the query time is shortened.

The present invention may be carried out in one form by providing a parallel database system retrieval method and system for use with a parallel database system which includes a front end server and a plurality of database operation servers. In response to a first query any of the database operation servers having accessed the queried data having a plurality of sub-data items returns only location information about the data to the front end server. The location information includes an address of the data in the database operation server in question and an identifier of that server. In response to a subsequent query the database operation servers submit the location information by use of variables. That is, the subsequent query is allowed to retrieve specific sub-data items by use of the received location information, dictionary information about locations of the sub-data items within the data in question, and identifiers of the necessary sub-data items. Because the location information includes the identifier of the database operation server having the data, the information allows a data retrieval request to be issued to that server. The address of the data inside the database operation server, also included in the location information, allows the data to be retrieved. The dictionary information about the sub-data item locations within the data and the identifiers of the sub-data items combine to let the desired sub-data items be located and retrieved from the data. The retrieved sub-data items are returned to the front end server which in turn may carry out a process using the received sub-data.

The point is that any of the database operation servers transfers to the front end server only the desired data items for use in subsequent processing. Thus if the portion of the data which is not used is significantly large, the query time is shortened considerably.

If the subsequent processing using the retrieved sub-data is an update of the previously retrieved data, an internal-format procedure for the update may receive the necessary sub-data to be updated on the side of the database operation server. In such a case, the query time is further reduced because of the absence of sub-data transfer from the database operation server to the front end server.

In a variation of the present invention as described above, one of two processes may be selected according to suitable criteria. The first process involves retrieving only location information about target data in an initial retrieval step, sub-data items of the data being retrieved in a subsequent retrieval step. The second process is a process in which the entire data including the sub-data items is submitted to the front end server in an initial retrieval step and handed over to subsequent processing. One of the first and second processes is selected upon comparison of the two processes in terms of the cost calculated from the lengths of the sub-data items and the communication time involved, and contingent on whether any of the sub-data items involved is longer than a predetermined reference value (e.g., LOB data) stipulated by the system. This arrangement makes it possible to select in a fine-tuned manner one of the two processes having the shorter query time depending on the current operating status. This is another way to achieve the object of the invention of query time reduction.

The present invention deals mainly with SQL for relational database, the mainstay of today's databases. As such, the present invention will be described below in conjunction with the ADT of SQL3 used as data of complicated structures. However, the invention applies to any database management system capable of handling sets of data each having a plurality of data items, wherein the host language has database queries embedded therein and allows data to be interchanged between a plurality of database queries.

BRIEF DESCRIPTION OF THE DRAWINGS

The present invention will be more apparent from the following detailed description, when taken in conjunction with the accompanying drawings, in which:

FIG. 2 is a view of typical data composed of a plurality of sub-data items;

FIG. 6 is a view of typical offset information about sub-data items;

FIG. 7 is a view of typical information for sub-data retrieval;

FIG. 8 is a view of a typical sub-data item;

FIGS. 9A and 9B are views of typical data stored in database operation servers;

FIG. 13 is a schematic flow diagram depicting steps for transferring and receiving an internal-format procedure;

FIG. 14 is a flowchart illustrating how an internal-format procedure is executed;

FIG. 19 is a schematic flow diagram depicting how the invention is illustratively applied to another specific SQL setup;

FIG. 20 is a schematic flow diagram of a parallel database system retrieval method practiced as an alternative embodiment of the invention;

FIG. 21 is a view of typical variable-bound information;

FIG. 22 is a schematic flow diagram of a query for retrieval of data composed of a plurality of sub-data items; and FIG. 23 is a schematic flow diagram of a query for sub-data utilization.

DESCRIPTION OF THE PREFERRED EMBODIMENTS

Figure 1:
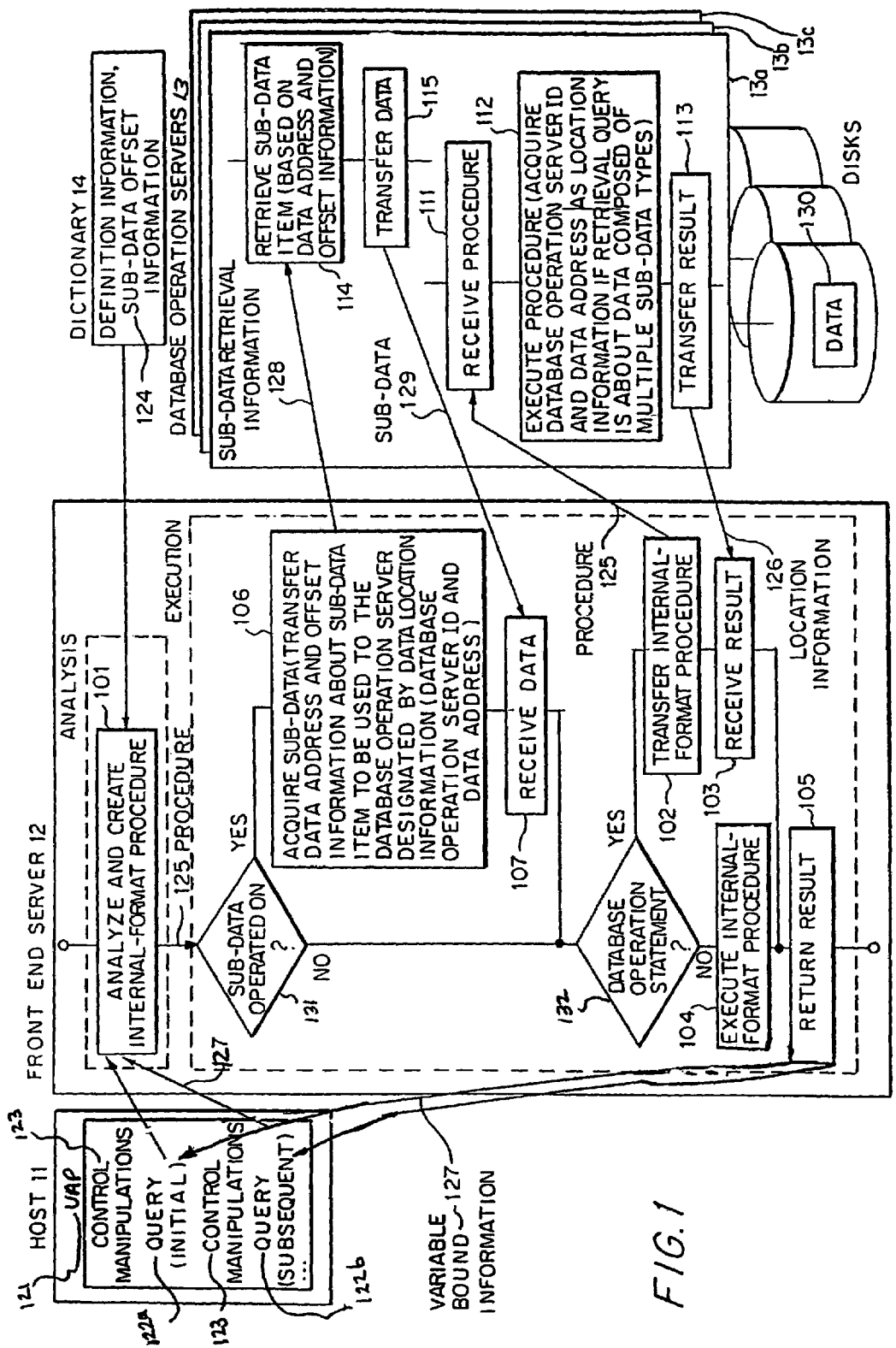
FIG. 1 is a schematic flow diagram depicting a parallel database system retrieval method embodying the invention.

Preferred embodiments of the invention will now be described with reference to the accompanying drawings. FIG. 1 is a schematic flow diagram depicting a parallel database system retrieval method embodying the invention. In FIG. 1, the system comprises a database server 12 that acts as a front end server handling database queries 122, and a plurality of database operation servers 13 for operating a database. The front end server 12 and database operation servers 13 are connected by a high-speed interconnection network.

In the present invention, the parallel database system having a plurality of network-connected processors may be replaced by a single processor system. The present invention also applies to the latter system as long as parallel processes are assigned the roles of separate servers.

The front end server 12 is connected to an external host 11 via a network. Since this invention is intended to reduce the amount of data transferred between the front end server 12 and database operation servers 13, the invention applies to a variety of alternative setups. One alternative may involve allocating the role of the host to the database system side, with a high-speed internal network installed to interconnect the servers. Another alternative to which the invention applies may involve unifying the role of the host and that of the front end server. In another alternative setup in which a series of queries are issued not by a user application program in the host but by stored procedures, the invention still applies if a plurality of sub-data items are queried for retrieval and transferred between queries by means of variables so that the retrieved sub-data items are used in subsequent queries.

Figure 10:
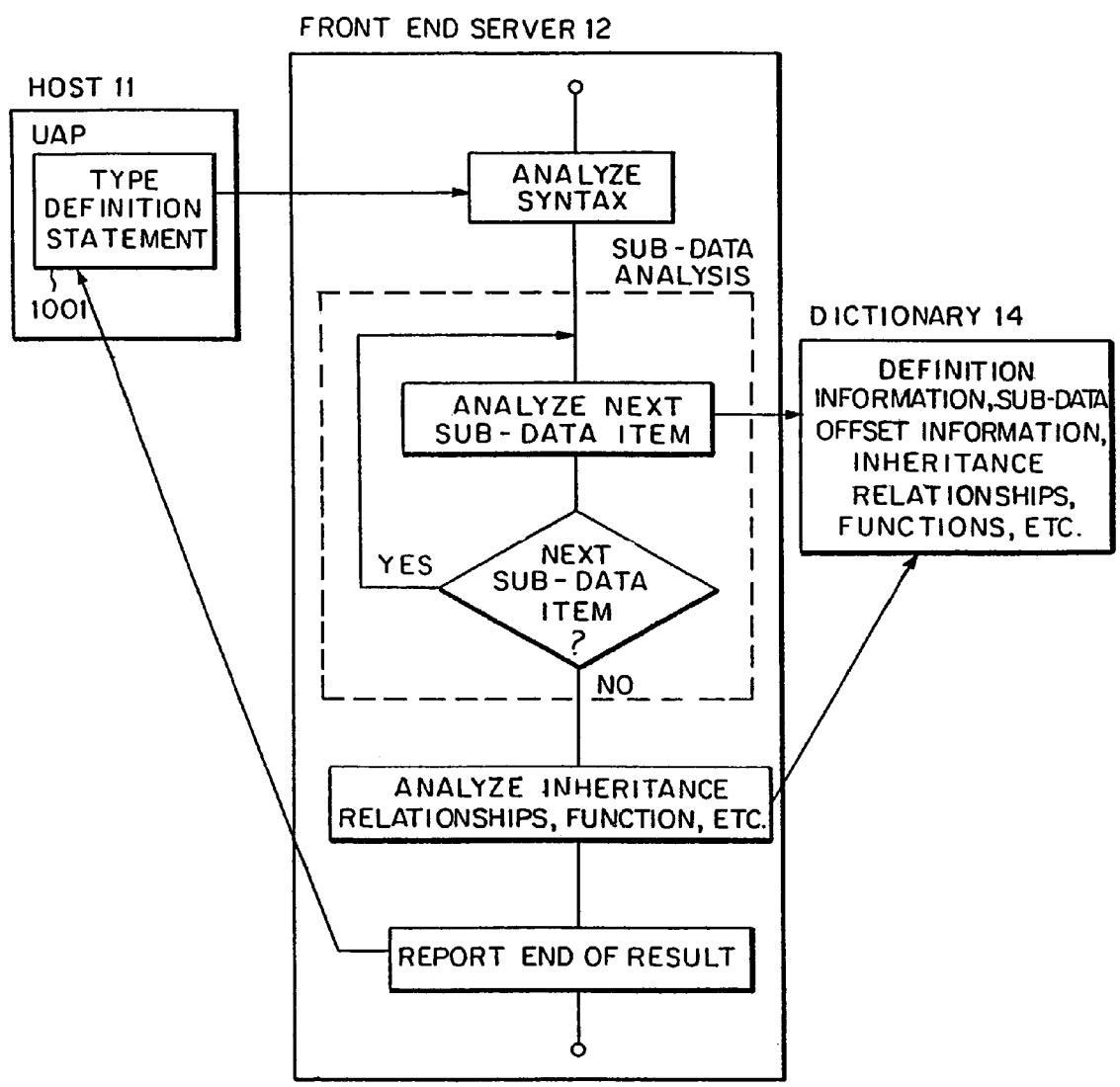
FIG. 10 is a schematic flow diagram of a typical setup for creating offset information about sub-data items.

FIG. 1 illustrates a representative setup in which database queries are analyzed and executed. Definition statements such as tables and types are analyzed as indicated in FIG. 10. Whether a database query or a definition statement has arrived is judged by semantic analysis. An analysis step 101 in FIG. 1 includes the judging process.

An initial retrieval query 122a is analyzed by the analysis step 101 in the front end server 12 to create an internal-format procedure 125. The internal-format procedure 125 may be written in execute form code or in interpreter code.

With the retrieval query 122a executed, if no operation on the sub-data is recognized in step 131 then processing proceeds to step 132. In step 132, if a database operation statement is recognized processing proceeds to step 102. In step 102 the internal-format procedure 125 is transferred to the database operation servers 13. In step 111, the database operation servers 13 receive the internal-format procedure 125. In step 112, the procedure 125 is executed. Specifically, if the retrieval query involves retrieval of data made up of a plurality of sub-data items, an identifier ID of the applicable database operation server and an address of the data in question are acquired from execution of the procedure. In step 113, the retrieved result 126 is transferred to the front end server 12. Step 113 is followed by step 103 in which the front end server 12 receives the transferred result. In step 105, the received result is returned to the user application program as information 127 to be submitted to a subsequent query 122b by use of variables.

The subsequent query 122b that uses the sub-data is analyzed by step 101 in the front end server 12. Because there exist the variables that serve as input, the variable-bound information 127 is transferred from the user application program. If the variable-bound information 127 is location information 126 about data composed of a plurality of sub-data items, then offset information 124 for retrieving desired sub-data is acquired from a dictionary 14. Using the information 127 and 124, the front end server 12 creates an internal-format procedure 125 for acquiring the sub-data and a query procedure that uses the acquired sub-data.

Executing the query 122b reveals the presence of a sub-data operation in step 131 and thus step 106 is carried out to acquire the sub-data. The database operation server identifier in the location information 126 obtained during the initial query indicates which database operation server has the data in question. Given the server identifier as well as information 128 necessary for sub-data retrieval, the front end server 12 issues a sub-data retrieval request to the database operation server 13 in question. The necessary information 128 for sub-data retrieval comprises the address of the data inside the database operation server 13 and the offset information 124 by which to retrieve the desired sub-data from within the data. A decision of which of the sub-data items is necessary is made during the analysis 101, and the information is embedded in the internal format for sub-data acquisition.

Upon receipt of the sub-data retrieval request, the database operation server 13 retrieves the applicable sub-data item in accordance with the data address and the sub-data offset location information. The retrieved sub-data item 129 is returned to the front end server 12 which issued the request earlier. In this embodiment, the system is arranged so that its database operation servers 13 receive data address information and sub-data offset information and return the retrieved sub-data as per the information. Alternatively, the invention also applies to a setup where an internal-format procedure for performing similar processing is generated upon query analysis. The procedure is then transferred for execution to the database operation server in question.

The front end sever 12 receives the necessary sub-data 129 in step 107. The location at which to receive the sub-data is pointed to beforehand during the analysis 101 from a sub-data use location in an internal-format procedure constituting a sub-data use process, which is the main process of the query 122b. With the location for sub-data reception thus designated, the sub-data may be used in subsequent steps 104 and 112 for executing the internal-format procedure 125, regardless of whether the subsequent query is found to be a database operation statement or not in step 132.

As described, the location information 126 alone is obtained in response to the initial query 122a for retrieval of data composed of a plurality of sub-data items, and only the necessary sub-data item 129 is acquired in response to the subsequent query 122b for sub-data use. This makes it possible to reduce the query time significantly especially when the amount of the unused data is massive (e.g., LOB data).

FIG. 2 is a view of typical data composed of a plurality of sub-data items. The data example describes a data type definition 21, a body of data 22 created in the defined type, and a data retrieval query 23.

The data type definition 21 includes names of sub-data items (called attributes in ADT) and a sub-data type definition 201. The sub-data type may be a system-defined or user-defined type. It is possible, optionally, to designate a definition 202 of a function or a procedure regarding the type data or to specify relationships of inheritance between data types.

As with system-defined type data, data made up of a plurality of sub-data items is used in the table definition 22. Inserting the data into a table creates illustratively address data 203 composed of sub-data items 204 such as a ZIP code, an address and a telephone number.

The data thus created is subject to queries 205 and 206 illustratively for data retrieval. The query 205 is intended for retrieval of a ZIP code, which is a sub-data item in the address data. The query 206 is for retrieving the address data whose sub-data address is Yokohama. In this manner, both an individual sub-data item and the entire data comprising a plurality of sub-data items may be retrieved by queries.

Figure 3:
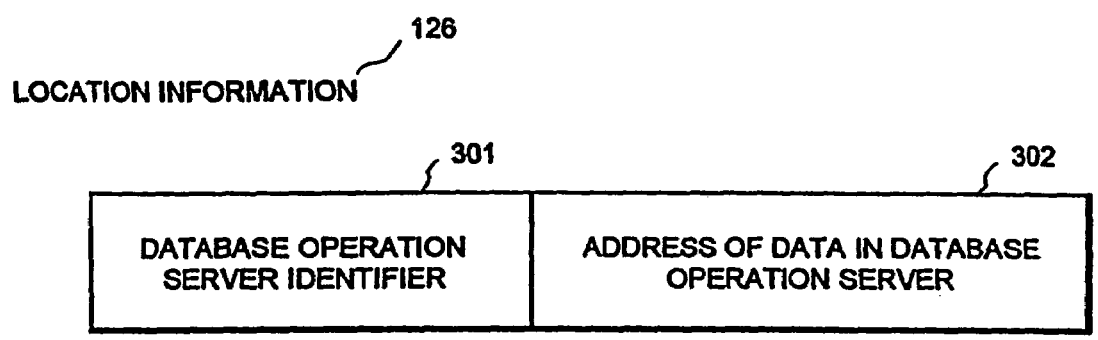
FIG. 3 is a view of typical location information.

FIG. 3 illustrates an example of location information 126 included in FIG. 1. The location information 126 comprises an identifier 301 of a database operation server 13 and an address 302 of data inside the server 13. Used in control operations by the front end server 12 or like entity, the location information 126 may include additional information such as a data type identifier. The database operation server identifier 301 may be any information that specifies the database operation server holding the data in question. The data address 302 may be either a real address at which the data is retained or a logical offset address designating the data relative to a starting address in memory.

Figure 4:
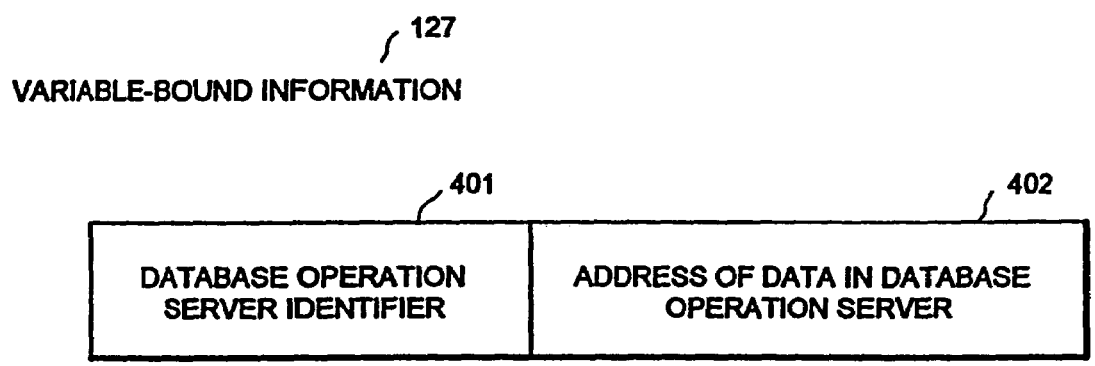
FIG. 4 is a view of typical variable-bound information.

FIG. 4 depicts an example of variable-bound information 127 included in FIG. 1. Shown in FIG. 4 is a case in which retrieved data composed of a plurality of sub-data items is bound to variables. If what needs to be retrieved is not the whole data made up of multiple sub-data items, then the information to be bound to variables is the data itself to be retrieved. The variable-bound information 127 includes an identifier 401 of a database operation server 13 and an address 402 of data inside the database operation server 13. Used in control operations by the front end server 12 or like entity, the information 127 may include additional information such as a data type identifier. The database operation server identifier 401 may be any information that specifies the database operation server holding the data in question. The data address 402 may be either a real address at which the data is retained or a logical offset address designating the data relative to a starting address in memory. An example of variable-bound information shown in FIG. 21 is associated with a setup permitting the choice of having data retained either on the front end side or on the back end side depending on the cost involved. In such a case, the variable-bound information comprises information indicating whether the data resides on the front end side or on the back end side. Where data made up of sub-data items is queried, the user application program in the host needs to provide a variable area long enough to accommodate the variable-bound information.

Figure 5:
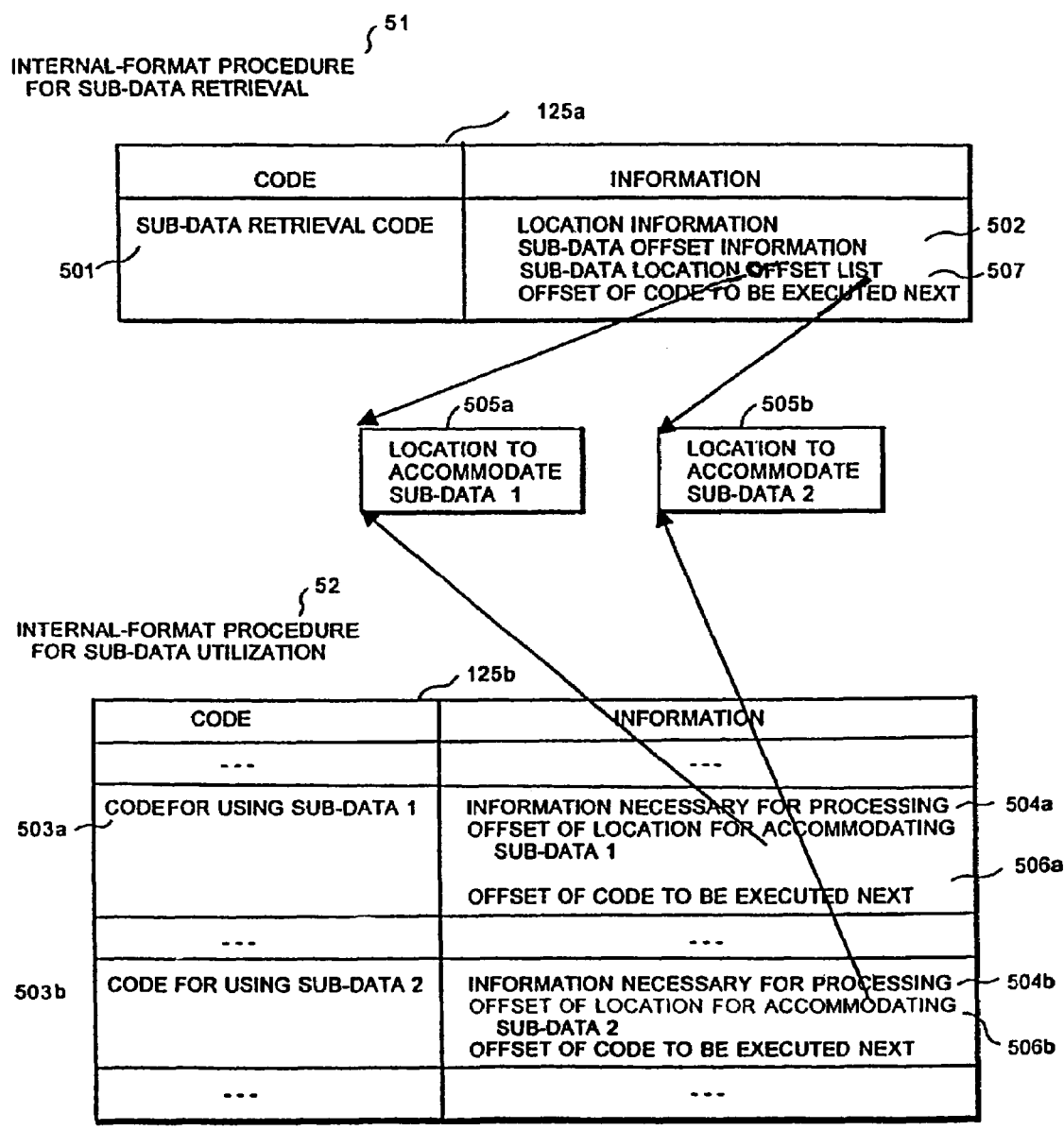
FIG. 5 is a schematic view of a typical internal-format procedure.

FIG. 5 illustrates an example of the internal-format procedure 125 included in FIG. 1. This procedure comprises codes to be interpreted and executed by interpreter and information attached to each of the codes. The attached information includes varieties of items contingent on the processing involved, such as the type and length of data to be retrieved, offset information regarding the sub-data items making up the data, and location information designating where the retrieved data is to be retained. Also included is information about the code to be executed next. Information 502 about a code 501 for sub-data retrieval contains data location information 126 and offset information about the sub-data to be used. If the internal-format procedure is written not in interpreter code but in execute form code, the invention still applies to such an arrangement. FIG. 5 depicts relations between an internal-format procedure 51 for retrieving the sub-data 129 from the location identified by the location information 126 on the one hand, and an internal-format procedure 52 for using the sub-data on the other hand. A location 505 at which to place the sub-data 129 retrieved by the procedure 51 is represented by an offset location 506 in shared memory. The location is included in information 504 about the code in which to use the sub-data with the procedure 52.

The information furnished as described above allows the procedure 52 to use the sub-data 129 retrieved by the procedure 51. The internal-format procedure 51 for sub-data retrieval and the internal-format procedure 52 for sub-data utilization may alternatively be unified into one procedure. In the example of FIG. 5, the process of retrieving the sub-data 129 involves having a code 501a interpreted and executed by use of the sub-data retrieval information 502. Alternatively, the sub-data retrieval process may comprise a plurality of codes representing a sub-data retrieval procedure. Whereas the example of FIG. 5 is a typical internal-format procedure setup for using the sub-data 129, there may be an alternative arrangement in which the internal-format procedure does not use sub-data. In the latter case, there is no need for the internal-format procedure 51 for sub-data retrieval or the offset information about the location 505 at which to place the sub-data 129. In the case of an internal-format procedure 51 for retrieving location information 126, the information needed for code interpretation and execution includes an offset location of a memory area equivalent the length of the location information to be retrieved.

FIG. 6 illustrates typical offset information 124 about sub-data included in FIG. 1. The sub-data offset information 124 is created for each of a plurality of sub-data items constituting a body of data. The sub-data offset information 124 comprises a sub-data identifier 601, a data type 602, a data length 603 and an offset location 604. The offset location represents an offset relative to a reference address such as the beginning of data. If the sub-data items are clustered together, the offset location of each sub-data item may be calculated from the data length 603. In such a case, the data type 602 and offset location 604 may be omitted. If there exists any variable-length sub-data item, its offset location cannot be placed in the dictionary 14. In that case, the offset locations are alternatively incorporated into data 130 so that each offset location will correspond to the applicable sub-data identifier 601. For example, where sub-data identifiers are numbered from 1 up in the order in which the corresponding sub-data items are defined, the offset locations may be arranged in the same order within the data 130.

FIG. 7 illustrates an example of the information 128 for sub-data retrieval included in FIG. 1. The information 128 comprises the address 302 of data in a database operation server 13 and offset information 701 about the sub-data 129 to be used. The offset information 701 about the target sub-data item includes a sub-data identifier 601, a data type 602, a data length 603 and an offset location 604. During the analysis 101, the offset information 701 about the sub-data 129 to be used allows the offset information about the identifier 601 of the target sub-data 129 to be retrieved from the sub-data offset information 124. Alternatively, the sub-data offset information 124 and the identifier of the sub-data 129 to be used may be included in the sub-data retrieval information 128, so that the database operation server 13 may select the offset information about the target sub-data 129.

FIG. 8 illustrates an example of the sub-data 129 included in FIG. 1. The sub-data 129 is real data 801 of the system-defined or user-defined type. If the sub-data to be retrieved is of user-defined type and if the data to be used is a sub-data item subordinate to another sub-data item, then the database operation server 13 may alternatively retrieve the sub-data item subordinate to another sub-data item by incorporating sub-data sub-data offset information into the sub-data retrieval information 701. If the sub-data item in question is subordinate to another sub-data item which in turn is subordinate to another sub-data item and so on, the invention still applies as long as the applicable offset information is incorporated similarly into the sub-data retrieval information 701.

FIGS. 9A and 9B illustrates examples of data 130 stored in database operation servers as illustrated in FIG. 1. In the database operation servers, the data 130 constitute a collection of data items 901 in columns. For rapid retrieval of data from any one column, the data in each column may have additional information such as offset information relative to the beginning of the data. The data in each column includes system-defined data 902 and user-defined data 903. The data type of each column is stipulated by a table definition such as "CREATE TABLE." The data 902 of the system-defined type and the data 903 of the user-defined type may appear any number of times in any sequence, provided at least either the data 902 or the data 903 appears once. FIG. 9A illustrates an example in which bodies of column data composed of a plurality of sub-data items each are clustered together and embedded in the overall data 130. If any sub-data item is variable in length, offset information 904 about each sub-data item may be provided for the data column having the variable-length sub-data item, as shown illustratively in FIG. 9B. That is, the structure of data 903b having the sub-data in question is identical to that of the entire data 130. Whereas the example of FIG. 9B illustrates offset information designating a location relative to the starting address of each sub-data item, this is not limitative of the invention. Other arrangements may also be used as long as there is provided information whereby sub-data locations are determined on the basis of sub-data identifiers. In another alternative, the offset information may be replaced by data length information that is incorporated into the variable-length sub-data item in question. If the desired sub-data item is retrieved by use of its identifier from the dictionary information in FIG. 6, the invention still applies to such an arrangement.

In a further alternative, the column data 903 composed of a plurality of sub-data items may be stored in areas separate from those of the entire data 130. In such a case, only pointers to the column data areas are included in the data 130.

FIG. 10 illustrates a typical setup for creating offset information 124 about sub-data items. The sub-data offset information 124 is created upon definition of the type of data composed of a plurality of sub-data items. A data type definition statement 1001 such as "CREATE TYPE" is analyzed in step 101 (FIG. 1) by the front end server 12. Each of the sub-data items constituting the data is checked for type. The sub-data identifier 601, data type 602, data length 603 and offset location 604 are obtained on the basis of a predetermined length for each type, or of a suitably defined length in the case of character strings. Any sub-data identifiers 602 may be used as long as they to correspond to sub-data names. Alternatively, the front end server may be separated from a server having the dictionary 14, so that analysis may be carried out by the latter server.

Figure 11:
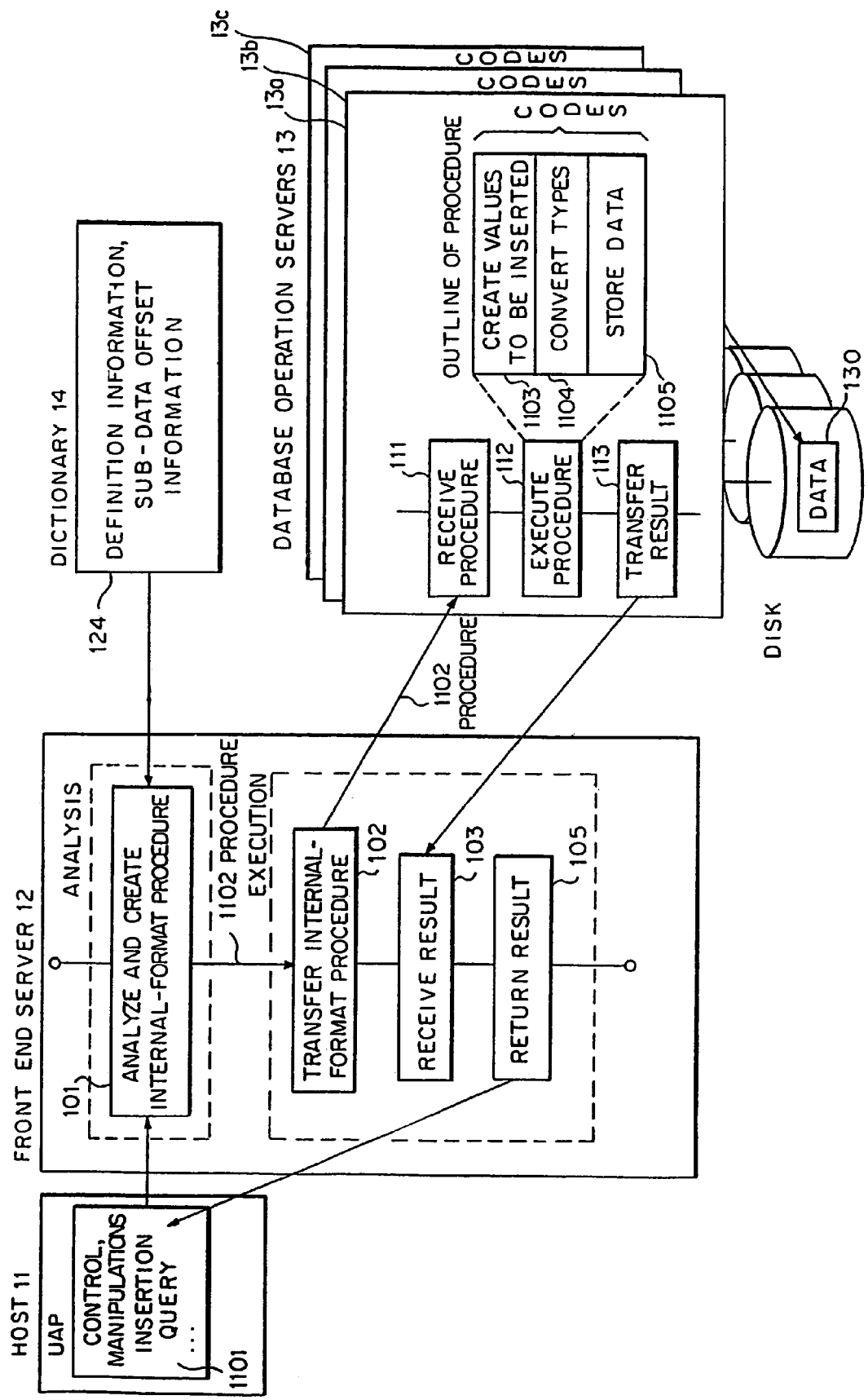
FIG. 11 is a schematic flow diagram of a typical setup for creating data composed of a plurality of sub-data items.

FIG. 11 illustrates a typical setup for creating data 130 composed of a plurality of sub-data items. Such data 130 made up of multiple sub-data items are created illustratively at the time of insertion queries. For creating the data, table definition information generated by use of table definition statements such as "CREATE TABLE" is used. The table definition information includes a column identifier and a data type corresponding to each column. As a feature that makes the inventive method distinct from the related art, the user-defined data type may also be used.

The representative setup in FIG. 11 is associated with an insertion query. In operation, an insertion query 1101 is analyzed in step 101 by the front end server 12. The insertion query 1101 includes value data to be inserted into each column. If the value data to be inserted is composed of a plurality of sub-data items, either the value of each sub-data item may be designated, or functions and their arguments may be specified for creating the data in question. With ADT, it is customary to designate functions and their arguments for creating the applicable data (arguments may be omitted in some cases). Where data are created by use of functions, the dictionary 14 accommodates the result of the analysis of the functions or like feature designated in the type definition outlined in FIG. 10.

The analysis 101 of the insertion query 1101 creates an internal-format procedure 1102 containing either values to be inserted or functions and arguments for generating values as the information to be interpreted and executed by interpreter. The information includes types and lengths of columns and sub-data items obtained from table definition information and sub-data offset information. The internal-format procedure 1102 is transferred to the database operation server 13 that holds the table in which to insert the values. For its part, the database operation server 13 receives and executes the internal-format procedure 1102. The codes to be executed by interpreter are prepared as insertion values in step 1103 on the basis of the type and length information about columns and sub-data items as well as information about those data. After type conversion in step 1104, the values are arranged into data 130 for storage in step 1105. With a sub-data item subordinate to another sub-data item, the data 130 is prepared through recursion or by use of similar processes. If the internal-format procedure 1102 is written not in codes to be interpreted and executed by interpreter but in execute form codes, the invention still applies to such an arrangement.

Figure 12:
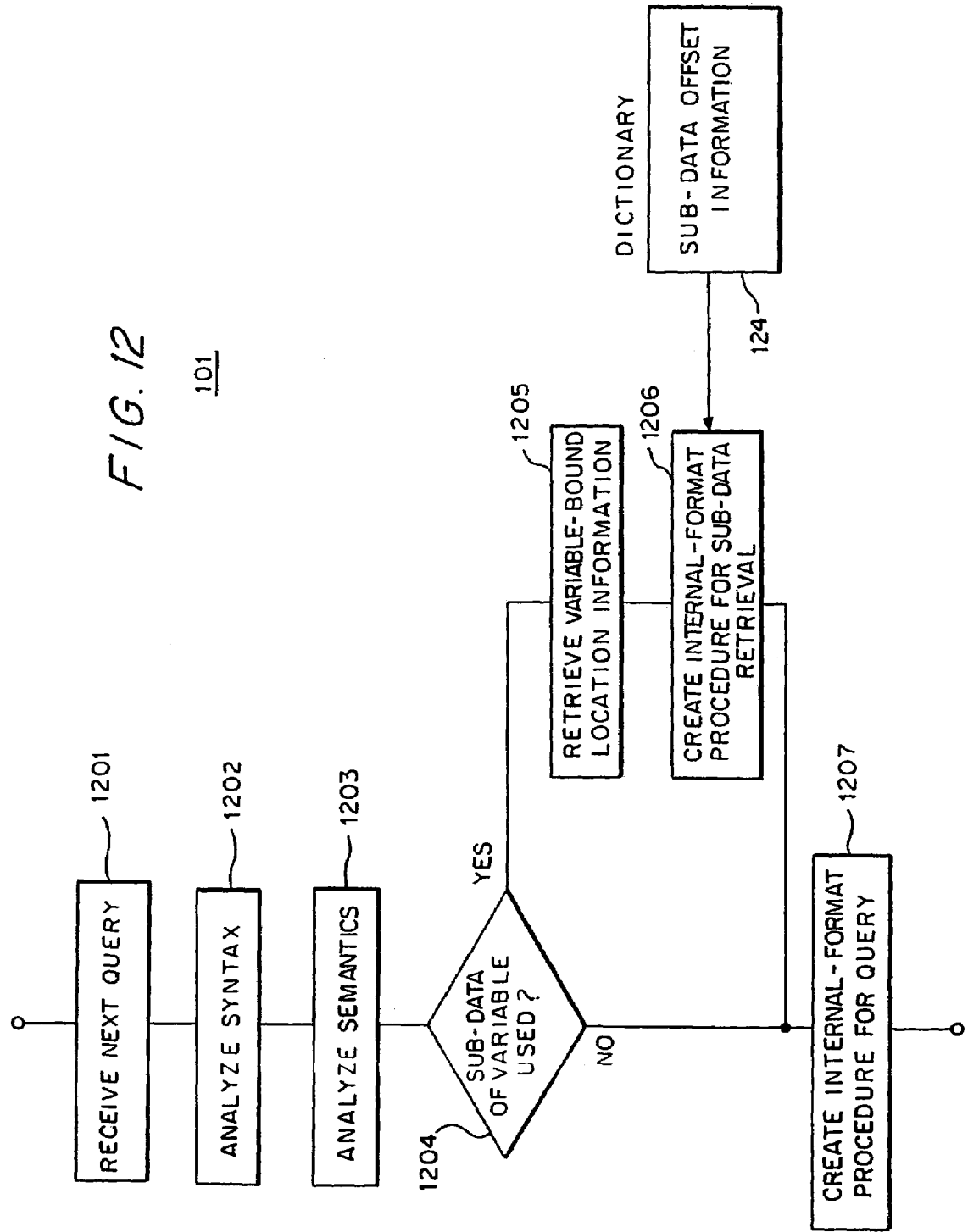
FIG. 12 is a flowchart illustrating how an internal-format procedure is prepared.

FIG. 12 is a flowchart illustrating in more detail how an internal-format procedure 125 is prepared in step 101 of FIG. 1. In step 1201, a query 122 is received along with variable-bound information 127 if there are inputs through variables. The query 122 is subjected to syntax analysis in step 1202 and to semantic analysis in step 1203. In step 1204, a check is made to see whether any sub-data item of any variable is used. If any such sub-data item is found to be used, the sub-data is analyzed for its identifier. Because there may be a plurality of sub-data items used in the query 122, any one sub-data item on the data using side and its counterpart on the data retrieving side are included in the analyzed result together with the same identifier. If there is any sub-data item of any variable is found to be used in step 1204, data location information 126 is retrieved from the variable-bound information in step 1205. In step 1206, the internal-format procedure 51 as shown in FIG. 5 for retrieving the sub-data item is created on the basis of the data location information 126, of the sub-data offset information 124 in the dictionary, and of the identifier of the sub-data item to be used. In step 1207, the procedure 52 as shown in FIG. 5 is created for the query 122 that uses the sub-data item.

When the sub-data item having the same identifier is given an offset representing the same storage location, sub-data items may be interchanged between the sub-data retrieving side 51 and the sub-data using side 52. If no sub-data item of any variable is found to be used in step 1204, there is no need for an internal-format procedure 51 for sub-data retrieval. In that case, step 1207 is reached in which only an internal-format procedure 51 for the query 122 is created. If the query involves execution of a database operation server 13, the internal-format procedure 51 is furnished with information about the database operation server to be executed. The information about the target server is acquired from information about division of the table to be manipulated. The information about the table division was designated at the time of table definition and is held in the dictionary.

FIG. 13 is a schematic flow diagram depicting in more detail steps 102 and 111 in FIG. 1 for transferring and receiving an internal-format procedure 125. In step 1301, one database operation servers 13 to be executed is determined. In step 1302, the internal-format procedure 125 is transferred to the selected database operation server 13. For its part, the database operation server 13 receives the internal-format procedure 125 in step 111, and executes the procedure 125 in step 112. Alternatively, each database operation server 13 may report the receipt of the procedure 125 to the front end server 12. When the receipt of the procedure 125 by all database operation servers 13 involved is confirmed, the front end server 12 may request all servers to start operating and execute the procedure 125 in step 112. In another alternative, the internal-format procedure 125 is placed in a cache of each database operation server. In such a case, the execution of the cached procedure for a second and subsequent iterations may be carried out by issuing execution requests to the caches.

FIG. 14 is a flowchart illustrating in more detail how step 104 in FIG. 1 is carried out to execute an internal-format procedure 125. In step 1401, one code is retrieved at a time by interpreter for the next execution. In step 1402, the code is interpreted and executed according to its attached information. In step 1403, a check is made to see if there still exists in the current information any code to be executed next. The process is repeated until the codes are exhausted.

Figure 15:
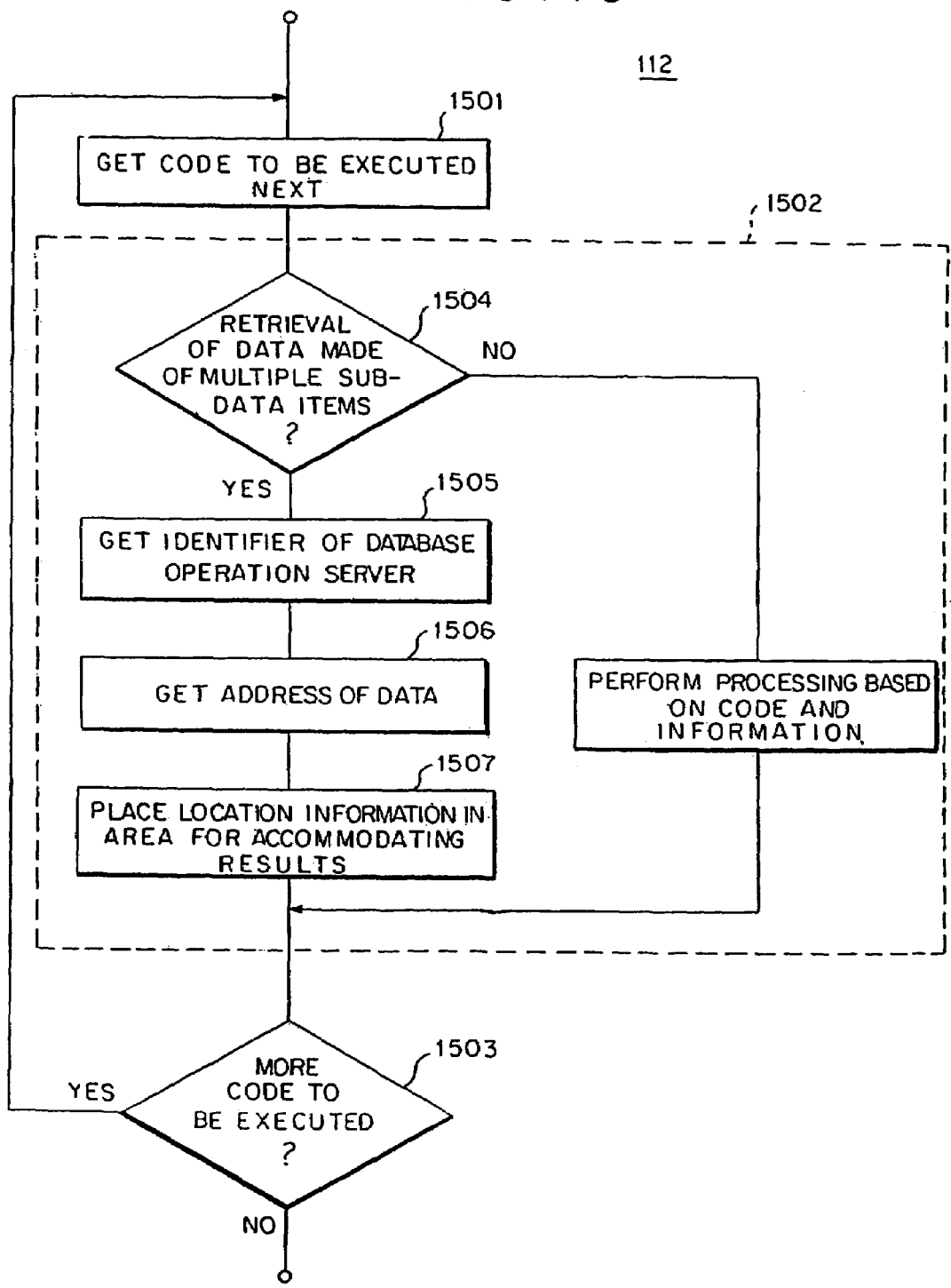
FIG. 15 is a flowchart illustrating detailed steps for procedure execution.

FIG. 15 is a flowchart illustrating in more detail how step 112 in FIG. 1 is carried out for procedure execution. The code execution by interpreter is performed in the same manner as depicted in FIG. 14. The codes handled by the interpreter on the side of the front end server 12 may be different from those on the side of the back end servers 13. In step 1501, one code at a time is retrieved by interpreter for the next execution. In step 1502, the code is interpreted and executed according to its attached information. In step 1503, a check is made to see if there still exists in the current information any code to be executed next. If the code being executed is found in step 1504 to constitute retrieval of data composed of a plurality of sub-data items, the identifier 301 of the database operation server 13*a* in question and the address 302 of the data therein are acquired. The server identifier and the data address are used to create the location information 126 in an area prepared to accommodate the analyzed result. Alternatively, the identifiers of the database operation servers 13 may be furnished in the internal-format procedure 125 as information for use by the codes. If the retrieval is for data not composed of multiple sub-data items, then the whole data is placed into the area reserved for accommodating the analyzed result.

Figure 16:
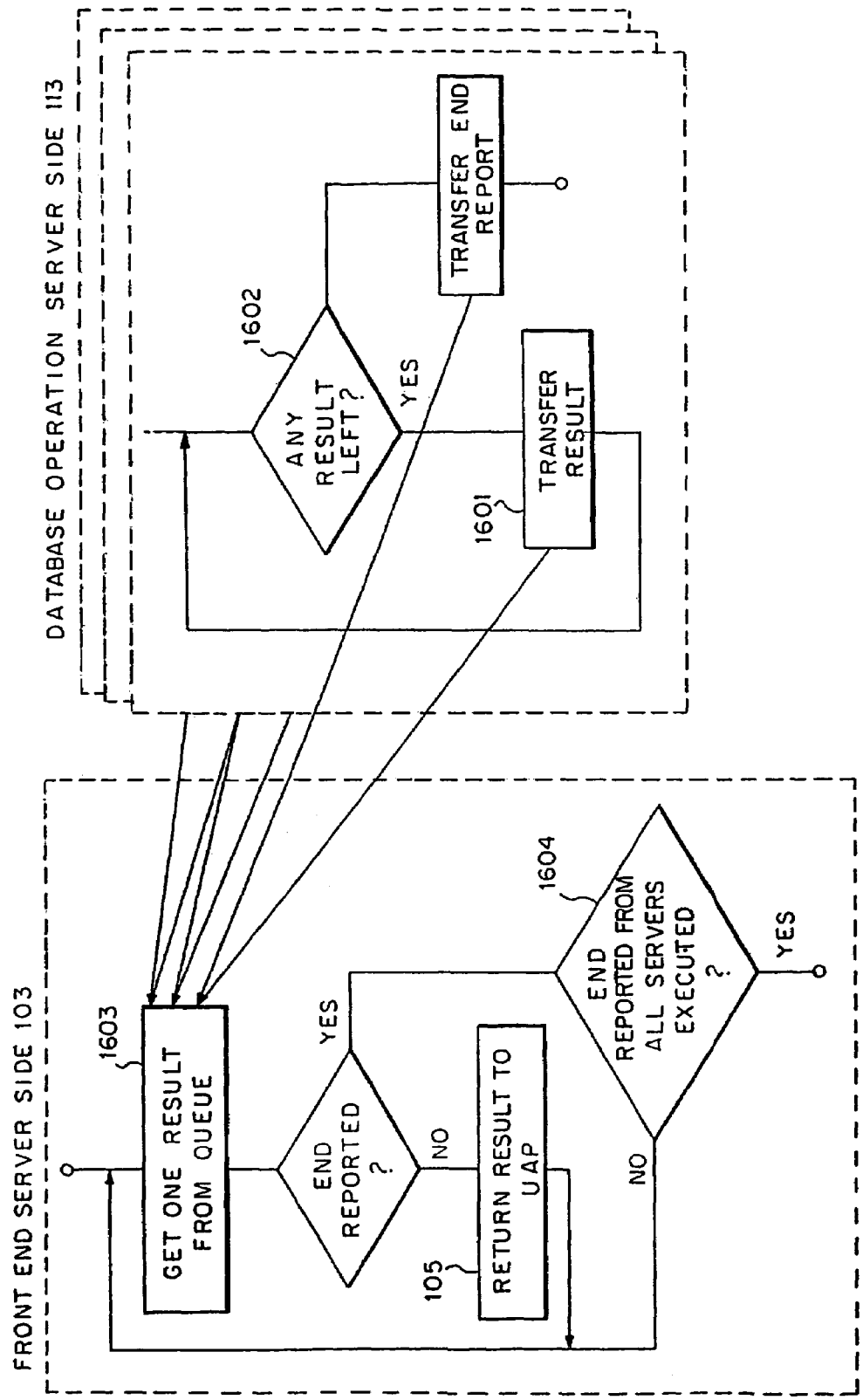
FIG. 16 is a schematic flow diagram showing detailed steps for transferring and receiving results of processing.

FIG. 16 is a schematic flow diagram illustrating in more detail steps 113 and 103 in FIG. 1 for transferring and receiving results of processing. In step 1601, the database operation server 13 to which the internal-format procedure 125 was sent transfers the results of the processing to the front end server side. The transfer of the processing results continues until the results are found to be exhausted in step 1602. Alternatively, the results may be transferred a plurality of items at a time. In step 1603, the front end server 12 retrieves the results from within a queue or like arrangement so that the results may be received in the order in which they were transferred.

Alternatively, a procedure for receipt of the results may be created during analysis. The results are received in step 1603 until the activated database operation server 13 reports the end of all results in step 1604. In step 105, the results are returned to the user application program in the host. Whereas the setup of FIG. 1 shows that all results have been received before they are returned to the user application program, it is possible alternatively to return to the host side every time one or a plurality of items are received. If the query is for retrieval, the retrieved results are returned. If the query is associated with data composed of a plurality of sub-data items, the queried results include the location information 126. If the query is for something other than retrieval, only the end of the results is reported.

Figure 17:
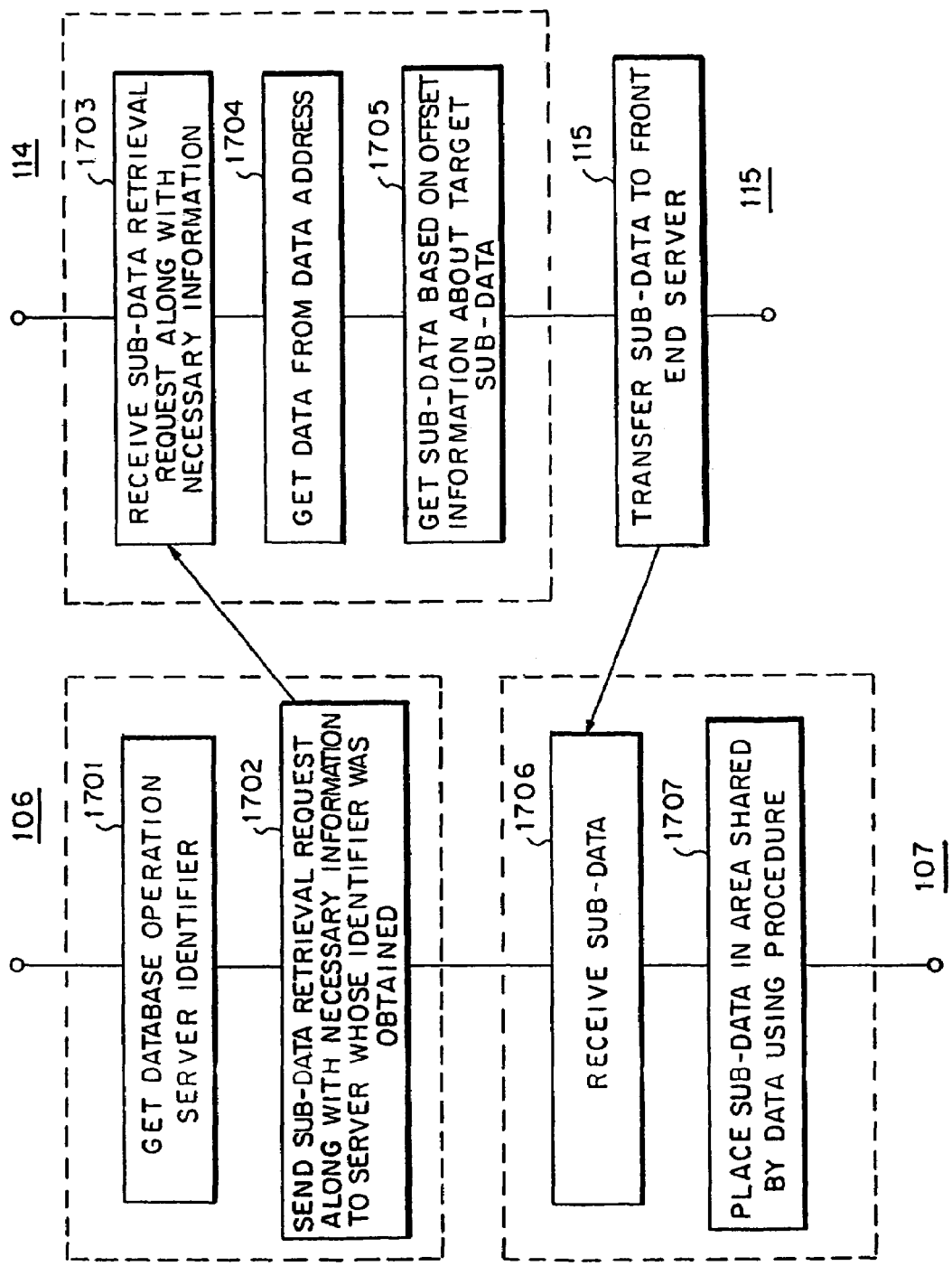
FIG. 17 is a flowchart depicting detailed steps for sub-data acquisition and retrieval.

FIG. 17 is a flowchart depicting in more detail step 106 for sub-data acquisition, step 114 for sub-data retrieval, step 115 for data transfer and step 107 for data receipt included in FIG. 1. In step 1701, the identifier of the database operation server 13 having the data is retrieved from the data location information 127. In step 1702, the front end server 12 sends a sub-data retrieval request along with information 128 necessary for sub-data retrieval to the database operation server 13 in question. In step 1703, the database operation server 13 receives the sub-data retrieval information 128 from the front end server 12. In step 1704, the target data is acquired according to the data address 302 within the database operation server 13.

In step 1705, on the basis of offset information 701 about the sub-data item 129 to be used, the sub-data item 129 is retrieved from the offset location 604 by as much as the data length 603 with respect to the data type 602. In a setup where the offset of a variable-length sub-data item is included in the data 130, the offset is acquired from the data 130 according to the identifier of the sub-data item in question, so that the sub-data item is retrieved by use of the offset. In step 115, the retrieved sub-data item 129 is transferred to the front end server 12. In step 1706, the front end server 13 receives the retrieved sub-data item 129. In step 1707, at least one sub-data item 129 thus received is moved to the location 505 which was prepared during the analysis 101 for storage of processing results. That location 505 is designated by an offset 506 in the internal-format procedure that uses sub-data items. It is now possible to use the sub-data thus retrieved.

It may happen that the query 122b for sub-data use, as in the case of an update of retrieved data, is incapable of transferring sub-data from the database operation server 13 to the front end server 12. In such a case, step 107 for placing sub-data into a location shared by the data-using procedure may alternatively be performed by the database operation server 13, and the location 505 in FIG. 5 at which to place the sub-data may be furnished on the side of the database operation server 13. Whether or not the query is for updating retrieved data may be judged during the analysis of the initial retrieval query 122a as long as the query specifies search for an update. In this case, there is no data transfer between the front end server 12 and database operation servers 13, which amounts to a reduction in query time.

In an alternative setup, if the query 122b for sub-data utilization is for updating the retrieved data and if the data address 403 is a real address indicating where the data is actually stored, then sub-data retrieval may not be carried out. Instead, the location information 127 and sub-data offset information 124 may be incorporated in the internal-format procedure 125 for update, so that the applicable data in the database may be updated directly. In that case, the data is not moved into memory but updated where it resides, which translates into a reduction in query time.

Figure 18:
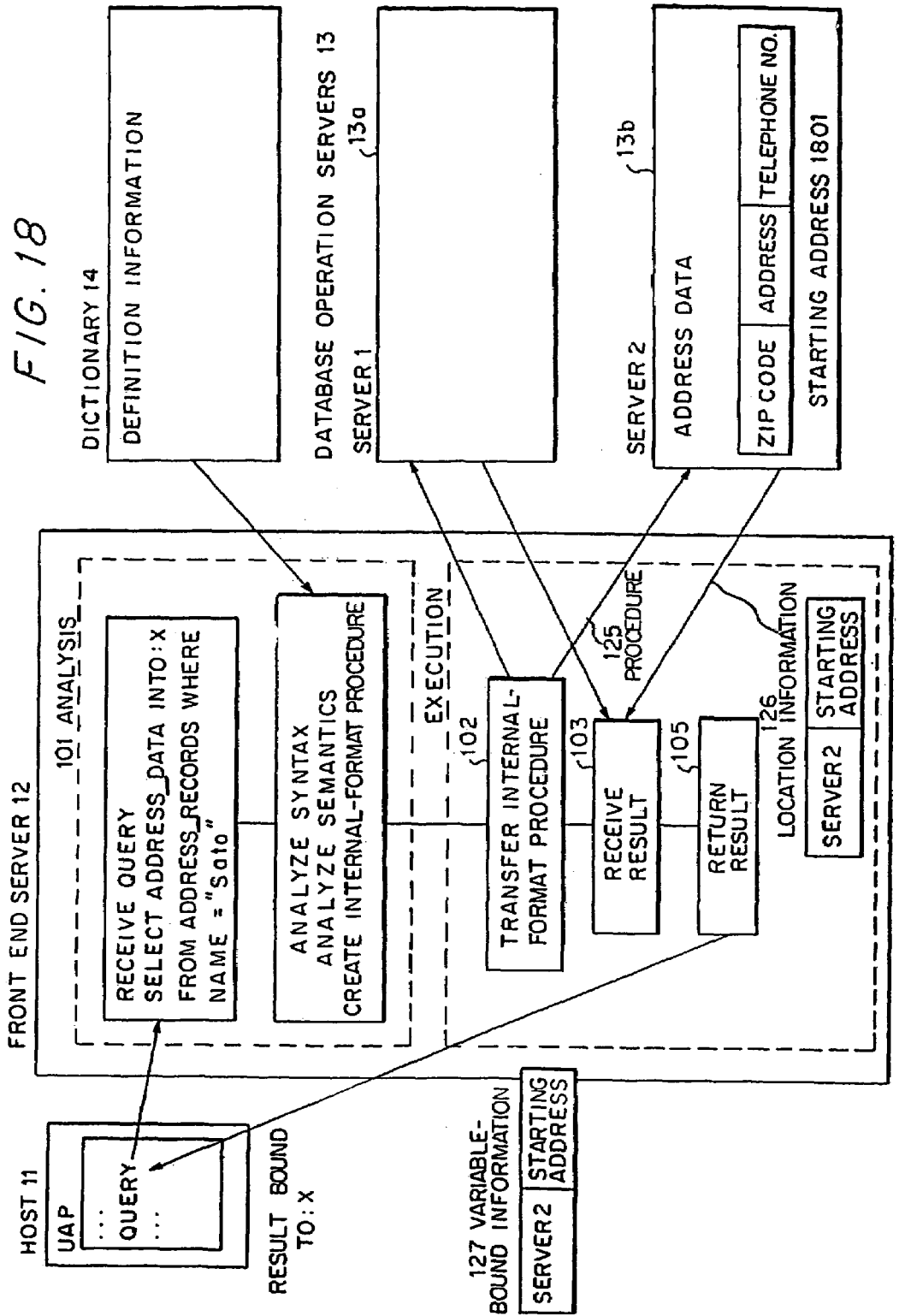
FIG. 18 is a schematic flow diagram showing how the invention is illustratively applied to a specific SQL setup.

FIGS. 18 and 19 are schematic flow diagrams showing how this invention is illustratively applied to specific SQL setups. FIG. 18 illustrates an SQL setup for retrieving data composed of a plurality of sub-data items, and FIG. 19 depicts an SQL setup for using a sub-data item retrieved by the setup of FIG. 18. The examples in the two figures show that one sub-data item is retrieved by an "INTO" statement for subsequent use. Alternatively, the invention also applies to a setup where a plurality of results are retrieved so that they are subsequently used one by one illustratively through a loop arrangement.

The setup of FIG. 18 involves analyzing and executing the SQL for retrieving address data from address records. Address data comprises three sub-data items: a ZIP code, an address, and a telephone number. An address record table and address data type definition information are acquired from the dictionary and analyzed to create an internal-format procedure 125. It is assumed that the address record table is split and held in two parts, e.g., servers 1 and 2 of database operation servers 13. It is also assumed that the data meeting a "WHERE" conditional statement is located in the server 2. In step 102 of FIG. 18, the internal-format procedure 125 is transferred to the servers 1 and 2. The procedure 125 database operation servers 13 is executed in step 112. Because the data that meets the condition exists in the server 2, the identifier of a database operation server 13b (i.e., server 2) is acquired in step 1505. In step 1506, an address 1801 of the data is acquired. In step 1507, the location information 126 is created. In step 113, the result 126 is returned to the front end server 12. The result 126 is returned to the user application program in the host as variable-bound information 127. Although disk drives are omitted in FIG. 18, the address may be either a real address at which the data resides or a logical offset address according to which the data is moved into memory.

The setup in FIG. 19 constitutes a query wherein a telephone number, which is a sub-data item within address data, is used as a condition for decision. The processing subsequent to the decision is omitted (marked as . . . ) since it is not relevant to the invention. In step 1201, the query is received and subjected to syntax and semantic analysis. Because the process uses a telephone number as a sub-data item in a variable X, an internal-format procedure 51 for sub-data retrieval as shown in FIG. 5 is created in step 1206 by use of the variable-bound information 127 and the offset information 124 about the sub-data telephone number to be used. In step 1207, an "IF" statement internal-format procedure 52 as shown in FIG. 5 is created for sub-data utilization. Upon execution, the server 2, i.e., the database operation server 13b retaining the data indicated by the location information 127 receives the sub-data telephone number offset information which constitutes sub-data retrieval information 128 and which is used together with an address from within the address data. In this example, the telephone number offset is 26. Illustratively, the ZIP code data length is 6, address data length is 20, and the telephone number is located 26 from the starting address of the address data. This allows the sub-data telephone number to be retrieved. It is assumed here that sub-data items are clustered together. For the purpose of simplification and illustration, the beginning of the first sub-data item is represented by 0. In a simplified alternative, address data may be placed in a cache for the retrieval query of FIG. 18 so that unnecessary I/O operations are not performed. The front end server 12 receives the retrieved sub-data item 129 in step 107 and sets the item in step 1707 to an area shared by the "IF" statement procedure using the sub-data. This makes it possible to use the sub-data item 129 when the "IF" statement procedure is carried out in step 104.

FIG. 20 is a schematic flow diagram of a parallel database system retrieval method practiced as an alternative embodiment of the invention. FIG. 20 illustrates an example of analyzing and executing the initial retrieval query 122a. What makes the setup of FIG. 20 different from that of FIG. 1 is that for the query 122a regarding data composed of a plurality of sub-data items, the retrieved result 2001 is not location information 126 but the data itself. In such a case, the information 127 to be bound to variables is either an address of data in the front end server 12 or data itself. If the user application program has no capability of receiving data composed of a plurality of sub-data items, then the retrieved data serves as a data address in the front end server 12. For the subsequent query 122b for sub-data utilization, the data exists on the front end server side and there is no need for any database operation server to carry out sub-data retrieval. In that case, the data and sub-data items in the front server 12 may be used directly.

FIG. 21 illustrates an example of the variable-bound information 127 in FIG. 1, different from the example in FIG. 4. This information 127 is for use in the setup of FIG. 22. The variable-bound information 127 comprises flag information 2101 indicating the transfer of either data or location information to the front end server 12.

The flag may be set to 0 when data is transferred to the front end server 12, and set to 1 when location information instead of data is transferred to the front end server 12. Alternatively, the flag information may be omitted if suitable means is provided to distinguish either data or location information that is transferred to the front end server 12. The variable-bound information 127 further includes information 2102 in effect when the data is transferred to the front end server 12, and information 2103 in effect when the location information is transferred to the front end server 12. The information 2102 is either the address of the data in the front end server 12 or the data itself. The information 2103 is constituted by the location information 126.

FIGS. 22 and 23 are schematic flow diagrams illustrating an example wherein either the method of FIG. 1 for transferring location information or the method of FIG. 20 for transferring data is selected on the basis of calculated costs or other suitable criteria. One selection criterion may involve calculating and comparing the costs of the respective methods based on dictionary information such as sub-data item lengths. Another criterion may involve checking the presence of massive sub-data items such as LOB data in the data to be retrieved. Where the latter criterion is illustratively adopted, the method of FIG. 1 is selected if any massive sub-data item is present, and the method of FIG. 20 is chosen in the absence of such sub-data items.

FIG. 22 is a schematic flow diagram of a query for retrieval of data composed of a plurality of sub-data items. The cost of the method 2202 in FIG. 1 and that of the method 2203 in FIG. 20 are analyzed in the analysis step 101 and calculated in step 2201. In step 105 in which the result is returned, the variable-bound information 127 in FIG. 21 is created. The user application program in the host needs to prepare a variable storage area long enough to accommodate the variable-bound information if the query is for retrieval of data composed of a plurality of sub-data items.

FIG. 23 is a schematic flow diagram of a query for sub-data utilization. During the analysis 101, the flag information 2101 in the variable-bound information 127 is checked to see whether the data is transferred to the front end server or the location information instead of the data is transferred thereto. According to the result of the check, either the method 2302 in FIG. 1 or the method 2303 in FIG. 20 is selected for subsequent use.

As described, the parallel database system retrieval method according to the invention allows an initial retrieval query to transfer location information about data composed of a plurality of sub-data items from a database operation server to the front end server, and permits a subsequent sub-data utilization query to retrieve only the desired sub-data item from within the data. The absence of the transfer of unnecessary sub-data items translates into reductions in communication time as well as in query time. The inventive method is particularly advantageous when applied to systems in which the unused sub-data items are massive data such as LOB data.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A method in a database system including a query processing part for data having a hierarchical structure, comprising:

storing information about a structure of said data having a hierarchical structure;

storing on a database said data having a hierarchical structure, defined by using a data type definition indicating a type of said data, said data having a hierarchical structure being composed of a plurality of sub-data items;

in response to a first query from the query processing part, retrieving both said data having a hierarchical structure and database location information for said data having a hierarchical structure from said database and returning to said query processing part said database location information of said data having a hierarchical structure; and in response to a second query from the query processing part, subsequent to said first query, returning to said query processing part said data having a hierarchical structure retrieved from said database based on said database location information.

2. A method according to claim 1, wherein said retrieving step retrieves said data having a hierarchical structure from said database based on said database location information and dictionary information concerning locations of data items within said data having a hierarchical structure and data identifiers necessary for queries.

3. A method according to claim 1, further comprising the step of:

performing a process using the retrieved data having a hierarchical structure.

4. A method according to claim 2, further comprising the step of:

performing a process using the retrieved data having a hierarchical structure.

5. A method according to claim 2, wherein said database location information comprises:

an identifier of said database having retrieved said data having a hierarchical structure and an address of said data having a hierarchical structure within said database.

6. A method according to claim 2, wherein said dictionary information of locations of said data items within said data having a hierarchical structure comprises:

offset values representing locations of said data items relative to a starting address, said data items being clustered within said data.

7. A method according to claim 2, wherein said data having a hierarchical structure comprises:

offset values representing locations of said data items relative to a starting address, said data items being clustered within said data having a hierarchical structure, and wherein a data item is retrieved by use of said offset value extracted.

8. A method in a database system including a query processing part for data having a hierarchical structure, comprising:

storing information about a structure of said data having a hierarchical structure;

storing on a database said data having a hierarchical structure, defined by using data type definition of the type of data, said data having a hierarchical structure being composed of a plurality of sub-data items;

in response to a first query from said query processing part, first retrieving both said data having a hierarchical structure and database location information for said data having a hierarchical structure from said database and returning to said query processing part said database location information of said data having a hierarchical structure; and in response to a second query from said query processing part, subsequent to said first query, second retrieving at least one of said sub-data items of said data having a hierarchical structure based on said database location information and returning to said query processing part said at least one of said sub-data items of said data having a hierarchical structure.

9. A method according to claim 8, wherein said second retrieving step retrieves said sub-data items of said data from said database based on said database location information and dictionary information concerning locations of said sub-data items within said data and sub-data identifiers necessary for queries.

10. A method according to claim 8, further comprising the step of:

performing a process using the retrieved sub-data items.

11. A method according to claim 9, further comprising the step of:

performing a process using the retrieved sub-data items.

12. A method according to claim 8, wherein said database location information comprises:

an identifier of said database having retrieved said data and an address of said data within said database.

13. A method according to claim 9, wherein said dictionary information of locations of said sub-data items within said data comprises:

offset values representing locations of said sub-data items relative to a starting address, said sub-data items being clustered within said data.

14. A method according to claim 9, wherein said data comprises:

offset values representing locations of said sub-data items relative to a starting address, said sub-data items being clustered within said data, and wherein a sub-data item is retrieved by use of said offset value extracted.

15. A method according to claim 11, wherein when said process using said retrieved sub-data items is an update of the retrieved data, an internal-format procedure for providing an update is sent together with said database location information of said data and said dictionary information of the locations of said sub-data items to said database operation server, so that said internal-format procedure in operation uses the retrieved sub-data items on the side of said database operation server.

* * * * *